(12) United States Patent
Machida

(10) Patent No.: US 11,448,860 B2
(45) Date of Patent: Sep. 20, 2022

(54) VARIABLE MAGNIFICATION OPTICAL SYSTEM, OPTICAL APPARATUS, IMAGING APPARATUS AND METHOD FOR MANUFACTURING VARIABLE MAGNIFICATION OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 188 days.

(21) Appl. No.: 16/900,321

(22) Filed: Jun. 12, 2020

(65) Prior Publication Data

US 2020/0310087 A1 Oct. 1, 2020

Related U.S. Application Data

(62) Division of application No. 15/759,829, filed as application No. PCT/JP2016/077469 on Sep. 16, 2016, now Pat. No. 10,725,272.

(30) Foreign Application Priority Data

Sep. 18, 2015 (JP) ................. 2015-185502

(51) Int. Cl.
*G02B 15/173* (2006.01)
*G02B 15/14* (2006.01)
(Continued)

(52) U.S. Cl.
CPC .......... *G02B 15/144113* (2019.08); *G02B 15/145113* (2019.08); *G02B 15/20* (2013.01); *G02B 27/646* (2013.01)

(58) Field of Classification Search
CPC .... G02B 15/173; G02B 15/20; G02B 27/646; G02B 15/144113
See application file for complete search history.

(56) References Cited

U.S. PATENT DOCUMENTS

| 6,101,042 A | 8/2000 | Sato |
| 2009/0086321 A1 | 4/2009 | Mizuguchi et al. |

(Continued)

FOREIGN PATENT DOCUMENTS

| JP | H04-293007 A | 10/1992 |
| JP | H11-295597 A | 10/1999 |

(Continued)

OTHER PUBLICATIONS

Office Action dated Jan. 28, 2020, in Japanese Patent Application No. 2017-540006.

(Continued)

*Primary Examiner* — Joseph P Martinez
(74) *Attorney, Agent, or Firm* — SGPatents PLLC

(57) ABSTRACT

A variable magnification optical system includes a positive first lens group disposed at a most object side, a negative intermediate group disposed at an image side of the first lens group, a positive focusing group disposed at an image side of the intermediate group, and a positive image side group disposed at an image side of the focusing group. Upon varying magnification, a distance between the first lens group and the intermediate group, a distance between the intermediate group and the focusing group and a distance between the focusing group and the image side group are varied; and the image side group includes, in order from an object side, a positive A group, a negative B group satisfying a predetermined conditional expression with respect to the A group, and a C group, whereby excellent optical performance, high speed focusing, and other advantages are achieved.

14 Claims, 34 Drawing Sheets

(51) Int. Cl.
G02B 27/64 (2006.01)
G02B 15/20 (2006.01)

(56) References Cited

U.S. PATENT DOCUMENTS

2011/0228407 A1   9/2011  Yamaguchi
2013/0208155 A1*  8/2013  Hatada ........... G02B 15/145125
                                                       359/557

FOREIGN PATENT DOCUMENTS

| JP | 2006-201524 A | 8/2006 |
| JP | 2009-086535 A | 4/2009 |
| JP | 2009-086537 A | 4/2009 |
| JP | 2011-090186 A | 5/2011 |
| JP | 2011-197302 A | 10/2011 |
| JP | 2012-118097 A | 6/2012 |
| JP | 2012-212087 A | 11/2012 |
| JP | 2014-126766 A | 7/2014 |

OTHER PUBLICATIONS

Extended European Search Report dated Apr. 24, 2019, in European Patent Application No. 16846628.2.
International Search Report from International Patent Application No. PCT/JP2016/077469, dated Nov. 1, 2016.

* cited by examiner

COMA ABERRATION

COMA ABERRATION

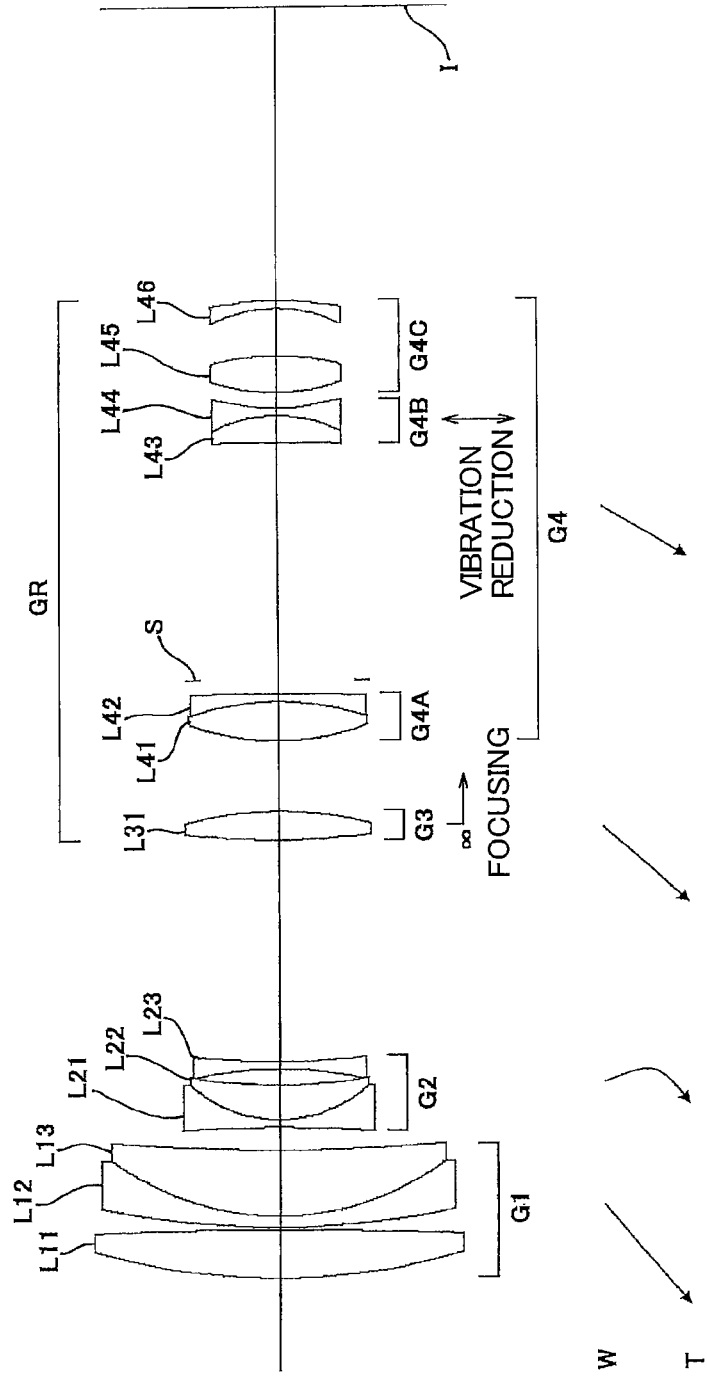

COMA ABERRATION

COMA ABERRATION

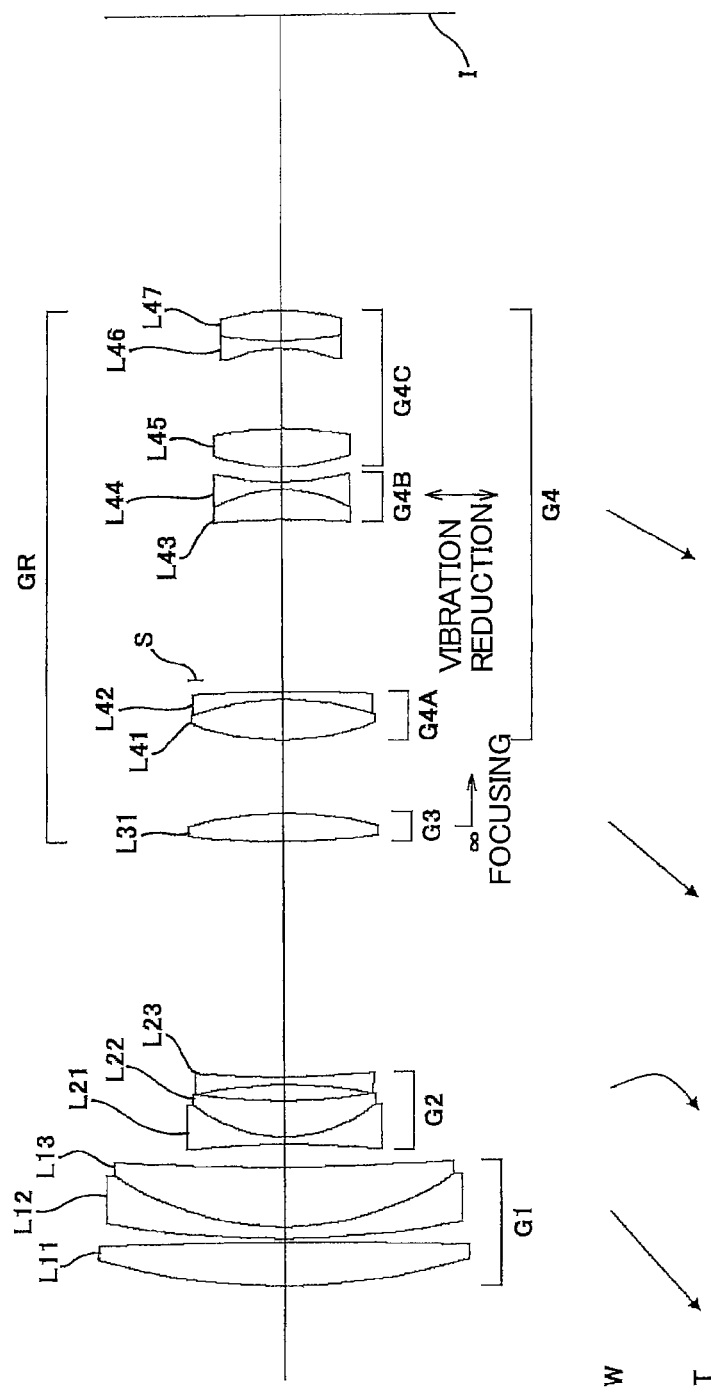

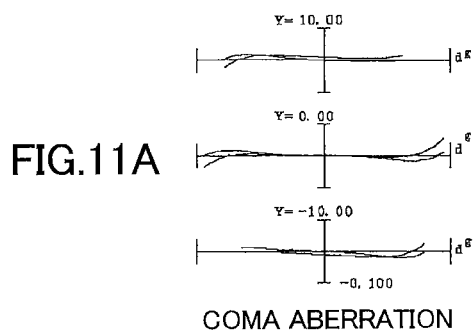
FIG.11A COMA ABERRATION
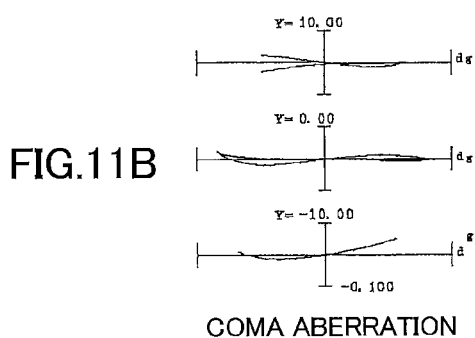
FIG.11B COMA ABERRATION

COMA ABERRATION

COMA ABERRATION

COMA ABERRATION

COMA ABERRATION

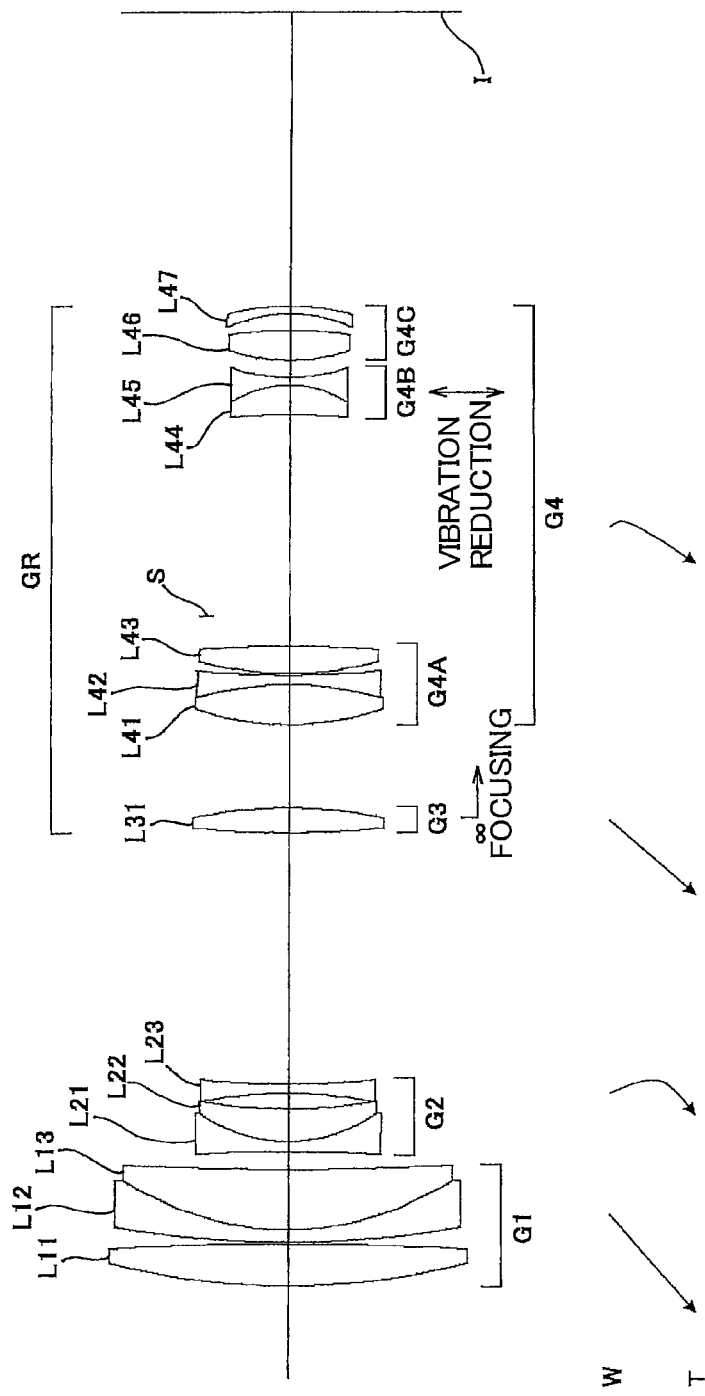

COMA ABERRATION

COMA ABERRATION

COMA ABERRATION

COMA ABERRATION

COMA ABERRATION

COMA ABERRATION

VARIABLE MAGNIFICATION OPTICAL SYSTEM, OPTICAL APPARATUS, IMAGING APPARATUS AND METHOD FOR MANUFACTURING VARIABLE MAGNIFICATION OPTICAL SYSTEM

TECHNICAL FIELD

The present invention relates to a variable magnification optical system, an optical apparatus, an imaging apparatus and a method for manufacturing the variable magnification optical system.

BACKGROUND ART

There has been proposed a variable magnification optical system that is suitable to be used for a photographic camera, an electronic still camera, a video camera and the like. For example, please refer to a Japanese Patent application Laid-Open Gazette No. H4-293007. However, a variable magnification optical system as disclosed in the Japanese Patent application Laid-Open Gazette No. H4-293007 is not intended to reduce a focusing group in weight sufficiently and is not suitable for attain high speed focusing operation.

PRIOR ART REFERENCE

Patent Document

Patent Document 1: Japanese Patent application Laid-Open Gazette No. H4-293007.

SUMMARY OF THE INVENTION

According to a first aspect of the present invention, there is provided a variable magnification optical system comprising a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power;

upon varying magnification, a distance between the first lens group and the intermediate group, a distance between the intermediate group and the focusing group and a distance between the focusing group and the image side group being varied; and the image side group comprising, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group,
and fB denotes a focal length of the B group.

Further, according to a second aspect of the present invention, there is provided a method for manufacturing a variable magnification optical system comprising steps of arranging a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power such that, upon varying magnification, a distance between the first lens group and the intermediate group, a distance between the intermediate group and the focusing group and a distance between the focusing group and the image side group are varied; and arranging such that the image side group is composed of, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group,
and fB denotes a focal length of the B group.

BRIEF DESCRIPTION OF THE DRAWINGS

FIG. 5 is a sectional view of a variable magnification optical system according to a Second Example.

FIG. 9 is a sectional view of a variable magnification optical system according to a Third Example.

FIGS. 11A and 11B are graphs showing meridional transverse aberrations of the variable magnification optical system according to the Third Example.

FIG. 21 is a sectional view of a variable magnification optical system according to a Sixth Example.

EMBODIMENT FOR CARRYING OUT THE INVENTION

Figure 1:
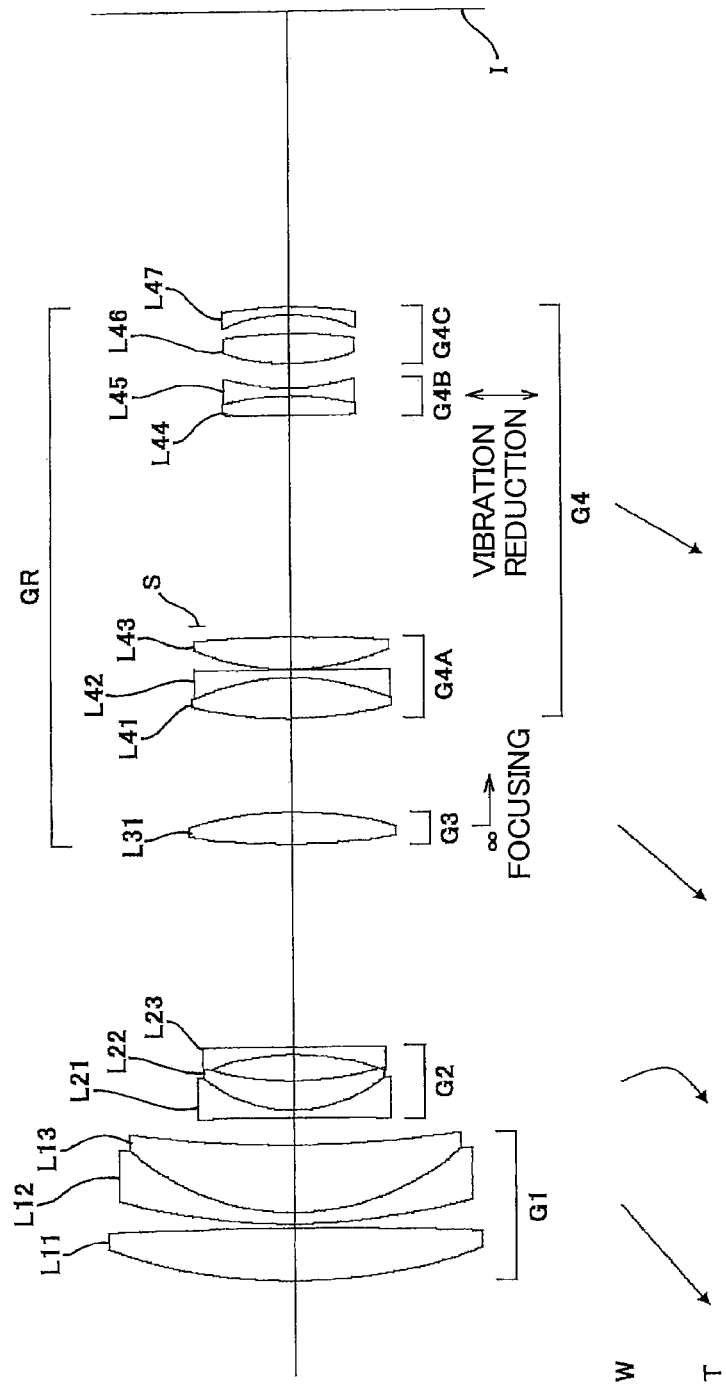
FIG. 1 is a sectional view of a variable magnification optical system according to a First Example.

Next, a variable magnification optical system according to the embodiment of the present invention, an optical apparatus, an imaging apparatus and a method for manufacturing the variable magnification optical system, will be explained.

The variable magnification optical system according to the present embodiment comprises a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power; upon varying magnification, a distance between the first lens group and the intermediate group, a distance between the intermediate group and the focusing group and a distance between the focusing group and the image side group being varied; and the image side group being composed of, in order from an object side, an A group having positive refractive power, a B group satisfying the following conditional expression (1) with respect to the A group and having negative refractive power, and a C group:

$$1.67 < fA/(-fB) < 2.80 \qquad (1)$$

where fA denotes a focal length of the A group, and fB denotes a focal length of the B group.

Further, in the variable magnification optical system according to the present embodiment, it is desirable that the focusing group is composed of one or two lens components.

Further, in the variable magnification optical system according to the present embodiment, it is desirable that the B group is disposed to be movable to have a displacement component in a direction perpendicular to the optical axis.

The focusing group of the present embodiment comprises at least one lens group. Further, the image side group of the present embodiment comprises at least one lens group. Furthermore, each of the A group, the B group and the C group of the present embodiment comprises at least one lens. Meanwhile, the term "lens group" in the present embodiment is a portion comprising at least one lens separated by an air space which varies upon varying magnification. Further, distance(s) between lenses included in lens groups in the present embodiment, is(are) not varied upon varying magnification, but is(are) changeable properly.

As described above, the variable magnification optical system according to the present embodiment comprises at least four lens groups and varies distances between lens groups upon varying magnification. With this configuration, it is possible to correct superbly various aberrations upon varying magnification.

Further, in the variable magnification optical system according to the present embodiment, as described above, the focusing group is composed of one or two lens components. With such configuration, the focusing group can be downsized and reduced in weight. Meanwhile, the term "lens component" in the present embodiment means a single lens or a cemented lens. Further, in the variable magnification optical system according to the present embodiment, the focusing group means a portion comprising at least one lens separated by an air space that changes upon focusing.

Furthermore, in the variable magnification optical system according to the present embodiment, as described above, the image side group is composed of, in order from the object side, the A group having positive refractive power, the B group having negative refractive power, and the C group, the B group being moved, as a vibration reduction group, to have a displacement component in a direction perpendicular to the optical axis. With such configuration, it is possible to correct displacement of imaging position caused by a camera shake or the like, in other words, vibration reduction can be carried out. Moreover, the vibration reduction group can be downsized, and in addition thereto deterioration in optical performance upon carrying out vibration reduction can be effectively suppressed. Meanwhile, the vibration reduction group in the present embodiment means a portion that is moved to have a component in a direction perpendicular to the optical axis upon carrying out vibration reduction.

The above conditional expression (1) defines a ratio of the focal length of the A group to the focal length of the B group that is the vibration reduction group. With satisfying the conditional expression (1), the variable magnification optical system according to the present embodiment can suppress effectively deterioration in optical performance upon carrying out vibration reduction.

When the value of fA/(−fB) is equal to or exceeds the upper limit value of the conditional expression (1) of the variable magnification optical system according to the present embodiment, refractive power of the vibration reduction group becomes large, and deterioration in eccentric coma aberration upon carrying out vibration reduction becomes large. Meanwhile, in order to ensure the advantageous effect of the present embodiment, it is preferable to set the upper limit value of the conditional expression (1) to 2.70. Further, in order to ensure the advantageous effect of the present embodiment more surely, it is preferable to set the upper limit value of the conditional expression (1) to 2.60.

On the other hand, when the value of fA/(−fB) is equal to or falls below the lower limit value of the conditional expression (1) of the variable magnification optical system according to the present embodiment, refractive power of the A group becomes large, and it becomes difficult to correct spherical aberration and other various aberrations. Further, refractive power of the vibration reduction group becomes small, and an amount of movement of the vibration reduction group upon carrying out vibration reduction becomes large. For this reason, a lens barrel that receives the variable magnification optical system according to the present embodiment becomes large in size, so this is not preferable. Meanwhile, in order to ensure the advantageous effect of the present embodiment, it is preferable to set the lower limit value of the conditional expression (1) to 1.68. Furthermore, in order to ensure the advantageous effect of the present embodiment more surely, it is preferable to set the lower limit value of the conditional expression (1) to 1.69.

With configurations as described above, it is possible to realize a variable magnification optical system having excellent optical performance and a focusing lens group reduced in weight in order to attain high speed focusing operation.

Further, in the variable magnification optical system according to the present embodiment, it is desirable that a distance between the A group and the B group is larger than a distance between the B group and the C group.

Further, in the variable magnification optical system according to the present embodiment, it is desirable that the following conditional expression (1A) is satisfied:

$$2.50 < f1/(-fc) < 6.20 \tag{1A}$$

where f1 denotes a focal length of the first lens group, and fc denotes a focal length of the intermediate group.

The conditional expression (1A) defines a ratio of the focal length of the first lens group to the focal length of the intermediate group. With satisfying the conditional expression (1A), the variable magnification optical system according to the present embodiment can suppress variations in spherical aberration and other various aberrations upon varying magnification from a wide angle end state to a telephoto end state.

When the value of f1/(−fc) is equal to or exceeds the upper limit value of the conditional expression (1A) of the variable magnification optical system according to the present embodiment, refractive power of the intermediate group becomes large, and it becomes difficult to correct spherical aberration and other various aberrations. Meanwhile, in order to ensure the advantageous effect of the present embodiment, it is preferable to set the upper limit value of the conditional expression (1A) to 5.90. Further, in order to ensure the advantageous effect of the present embodiment more surely, it is preferable to set the upper limit value of the conditional expression (1A) to 5.60.

On the other hand, when the value of f1/(−fc) is equal to or falls below the lower limit value of the conditional expression (1A) of the variable magnification optical system according to the present embodiment, refractive power of the first lens group becomes large, and it becomes difficult to correct spherical aberration and other various aberrations. Meanwhile, in order to ensure the advantageous effect of the present embodiment, it is preferable to set the lower limit value of the conditional expression (1A) to 2.80. Furthermore, in order to ensure the advantageous effect of the present embodiment more surely, it is preferable to set the lower limit value of the conditional expression (1A) to 3.70.

Further, in the variable magnification optical system according to the present embodiment it is desirable that the following conditional expression (1B) is satisfied:

$$3.00 < f1fw/ff < 9.00 \tag{1B}$$

where f1fw denotes a composite focal length from the first lens group to the focusing group in the wide angle end state, and ff denotes a focal length of the focusing group.

The conditional expression (1B) defines a ratio of the composite focal length from the first lens group to the focusing group in the wide angle end state to the focal length of the focusing group. With satisfying the conditional expression (1B), the variable magnification optical system according to the present embodiment can suppress variations in spherical aberration and other various aberrations upon focusing from an infinitely distant object to a close distance object in the wide angle end state.

When the value of f1fw/ff is equal to or exceeds the upper limit value of the conditional expression (1B) of the variable magnification optical system according to the present embodiment, refractive power of the focusing group becomes large, and it becomes difficult to suppress variations in spherical aberration and other various aberrations upon focusing from an infinitely distant object to a close distance object in the wide angle end state. Meanwhile, in order to ensure the advantageous effect of the present embodiment, it is preferable to set the upper limit value of the conditional expression (1B) to 8.50. Further, in order to ensure the advantageous effect of the present embodiment more surely, it is preferable to set the upper limit value of the conditional expression (1B) to 8.00.

On the other hand, when the value of f1fw/ff is equal to or falls below the lower limit value of the conditional expression (1B) of the variable magnification optical system according to the present embodiment, refractive power from the first lens group to the focusing group in the wide angle end state becomes large, and it becomes difficult to suppress variations in spherical aberration and other various aberrations upon focusing from an infinitely distant object to a close distance object in the wide angle end state. Meanwhile, in order to ensure the advantageous effect of the present embodiment, it is preferable to set the lower limit value of the conditional expression (1B) to 3.30. Furthermore, in order to ensure the advantageous effect of the present embodiment more surely, it is preferable to set the lower limit value of the conditional expression (1B) to 3.60.

Further, in the variable magnification optical system according to the present embodiment it is desirable that the following conditional expression (2) is satisfied:

$$1.50 < f1/ff < 2.35 \tag{2}$$

where f1 denotes a focal length of the first lens group, and ff denotes a focal length of the focusing group.

The conditional expression (2) defines a ratio of the focal length of the first lens group to the focal length of the focusing group. With satisfying the conditional expression (2), the variable magnification optical system according to the present embodiment can suppress variations in spherical aberration and other various aberrations upon carrying out focusing from an infinitely distant object to a close distance object.

When the value of f1/ff is equal to or exceeds the upper limit value of the conditional expression (2) of the variable magnification optical system according to the present embodiment, refractive power of the focusing group becomes large, and it becomes difficult to suppress variations in spherical aberration and other various aberrations upon carrying out focusing from an infinitely distant object to a close distance object. Meanwhile, in order to ensure the advantageous effect of the present embodiment, it is preferable to set the upper limit value of the conditional expression (2) to 2.30. Further, in order to ensure the advantageous effect of the present embodiment more surely, it is preferable to set the upper limit value of the conditional expression (2) to 2.25.

On the other hand, when the value of f1/ff is equal to or falls below the lower limit value of the conditional expression (2) of the variable magnification optical system according to the present embodiment, refractive power of the first lens group becomes large, and it becomes difficult to correct spherical aberration and other various aberrations. Meanwhile, in order to ensure the advantageous effect of the present embodiment, it is preferable to set the lower limit value of the conditional expression (2) to 1.60. Furthermore, in order to ensure the advantageous effect of the present embodiment more surely, it is preferable to set the lower limit value of the conditional expression (2) to 1.70.

Further, in the variable magnification optical system according to the present embodiment it is desirable that the first lens group is moved toward the object side upon varying magnification from the wide angle end state to the telephoto end state. With such a configuration, the whole length of the variable magnification optical system according to the present embodiment can be reduced in the wide angle end state, thereby it becoming possible to downsize the variable magnification optical system according to the present embodiment.

Further, in the variable magnification optical system according to the present embodiment it is desirable that a distance between the focusing group and the image side group is increased upon varying magnification from the wide angle end state to the telephoto end state. With this configuration, various aberrations upon varying magnification can be corrected superbly. In particular, it is possible to secure sufficiently a space for moving the focusing group for focusing in the telephoto end state, so it is possible to correct excellently spherical aberration upon focusing on a close distance object in the telephoto end state.

Further, in the variable magnification optical system according to the present embodiment it is desirable that the following conditional expression (3) is satisfied:

$$0.25 < ff/fi < 1.10 \qquad (3)$$

where ff denotes a focal length of the focusing group, and fi denotes a focal length of the image side group.

The conditional expression (3) defines a ratio of the focal length of the focusing group to the focal length of the image side group. With satisfying the conditional expression (3), the variable magnification optical system according to the present embodiment can suppress variations in spherical aberration and other various aberrations upon focusing from an infinitely distant object to a close distance object.

When the value of ff/fi is equal to or exceeds the upper limit value of the conditional expression (3) of the variable magnification optical system according to the present embodiment, refractive power of the image side group becomes large, and it becomes difficult to suppress coma aberration and other various aberrations. Meanwhile, in order to ensure the advantageous effect of the present embodiment, it is preferable to set the upper limit value of the conditional expression (3) to 1.05. Further, in order to ensure the advantageous effect of the present embodiment more surely, it is preferable to set the upper limit value of the conditional expression (3) to 1.00.

On the other hand, when the value of ff/fi is equal to or falls below the lower limit value of the conditional expression (3) of the variable magnification optical system according to the present embodiment, refractive power of the focusing group becomes large, and it becomes difficult to correct variations in spherical aberration and other various aberrations upon focusing from an infinitely distant object to a close distance object. Meanwhile, in order to ensure the advantageous effect of the present embodiment, it is preferable to set the lower limit value of the conditional expression (3) to 0.28. Furthermore, in order to ensure the advantageous effect of the present embodiment more surely, it is preferable to set the lower limit value of the conditional expression (3) to 0.31.

Further, in the variable magnification optical system according to the present embodiment it is desirable that the following conditional expression (4) is satisfied:

$$1.80 < fi/(-fB) < 5.20 \qquad (4)$$

where fi denotes a focal length of the image side group, and fB denotes a focal length of the B group.

The conditional expression (4) defines a ratio of the focal length of the image side group to the focal length of the B group that is the vibration reduction group. With satisfying the conditional expression (4), the variable magnification optical system according to the present embodiment can suppress effectively deterioration of optical performance upon carrying out vibration reduction.

When the value of fi/(-fB) is equal to or exceeds the upper limit value of the conditional expression (4) of the variable magnification optical system according to the present embodiment, refractive power of the vibration reduction group becomes large, and deterioration of eccentric coma aberration upon carrying out vibration reduction becomes large. Meanwhile, in order to ensure the advantageous effect of the present embodiment, it is preferable to set the upper limit value of the conditional expression (4) to 5.00. Further, in order to ensure the advantageous effect of the present embodiment more surely, it is preferable to set the upper limit value of the conditional expression (4) to 4.90.

On the other hand, when the value of fi/(-fB) is equal to or falls below the lower limit value of the conditional expression (4) of the variable magnification optical system according to the present embodiment, refractive power of the image side group becomes large, and it becomes difficult to correct coma aberration and other various aberrations. Further, refractive power of the vibration reduction group becomes small, and an amount of movement of the vibration reduction group upon carrying out vibration reduction becomes large. For this reason, a lens barrel that receives the variable magnification optical system according to the present embodiment becomes large in size, so this is not preferable. Meanwhile, in order to ensure the advantageous effect of the present embodiment, it is preferable to set the lower limit value of the conditional expression (4) to 1.90. Further, in order to ensure the advantageous effect of the present embodiment more surely, it is preferable to set the lower limit value of the conditional expression (4) to 2.00.

Further, in the variable magnification optical system according to the present embodiment, it is desirable that the first lens group comprises at least two positive lenses. With this configuration, spherical aberration and chromatic aberration can be corrected effectively.

Further, in the variable magnification optical system according to the present embodiment, it is desirable that the focusing group is composed of one lens component. With this configuration, the focusing group can be made smaller in size and made lighter in weight.

Further, in the variable magnification optical system according to the present embodiment, it is desirable that the focusing group is composed of one single lens. With this configuration, the focusing group can be made lighter in weight.

Further, in the variable magnification optical system according to the present embodiment, it is desirable that the focusing group comprises at least one positive lens and the following conditional expression (5) is satisfied:

$$58.00 < vFP \tag{5}$$

where vFP denotes an Abbe number for d-line (wavelength 587.6 nm) of the positive lens comprised in the focusing group.

The conditional expression (5) defines an Abbe number of the positive lens comprised in the focusing group. With satisfying the conditional expression (5), the variable magnification optical system according to the present embodiment can suppress variation in chromatic aberration upon focusing from an infinitely distant object to a close distance object.

When the value of vFP is equal to or falls below the lower limit value of the conditional expression (5) of the variable magnification optical system according to the present embodiment, large chromatic aberration in the focusing group occurs, so that variation in chromatic aberration upon focusing from an infinitely distant object to a close distance object becomes large. Meanwhile, in order to ensure the advantageous effect of the present embodiment, it is preferable to set the lower limit value of the conditional expression (5) to 59.00. Furthermore, in order to ensure the advantageous effect of the present embodiment more surely, it is preferable to set the lower limit value of the conditional expression (5) to 60.00.

Further, in the variable magnification optical system according to the present embodiment it is desirable that the following conditional expression (6) is satisfied:

$$0.15 < ff/ft < 0.30 \tag{6}$$

where ff denotes a focal length of the focusing group, and ft denotes a focal length of the variable magnification optical system in the telephoto end state.

The conditional expression (6) defines a ratio of the focal length of the focusing group to the focal length of the variable magnification optical system according to the present embodiment in the telephoto end state. With satisfying the conditional expression (6), the variable magnification optical system according to the present embodiment can suppress variations in spherical aberration and other various aberrations upon focusing from an infinitely distant object to a close distance object.

When the value of ff/ft is equal to or exceeds the upper limit value of the conditional expression (6) of the variable magnification optical system according to the present embodiment, an amount of movement of the focusing group upon focusing from an infinitely distant object to a close distance object becomes large, and it becomes difficult to suppress variations in spherical aberration and other various aberrations. Meanwhile, in order to ensure the advantageous effect of the present embodiment, it is preferable to set the upper limit value of the conditional expression (6) to 0.28. Further, in order to ensure the advantageous effect of the present embodiment more surely, it is preferable to set the upper limit value of the conditional expression (6) to 0.26.

On the other hand, when the value of ff/ft is equal to or falls below the lower limit value of the conditional expression (6) of the variable magnification optical system according to the present embodiment, refractive power of the focusing group becomes large, and it becomes difficult to correct variations in spherical aberration and other various aberrations upon focusing from an infinitely distant object to a close distance object. Meanwhile, in order to ensure the advantageous effect of the present embodiment, it is preferable to set the lower limit value of the conditional expression (6) to 0.17. Furthermore, in order to ensure the advantageous effect of the present embodiment more surely, it is preferable to set the lower limit value of the conditional expression (6) to 0.19.

An optical apparatus according to an embodiment of the present invention comprises a variable magnification optical system configured as above-mentioned.

An imaging apparatus according to an embodiment of the present invention is equipped with a variable magnification optical system configured as above-mentioned and an imaging unit for capturing an image formed by the variable magnification optical system.

With such configurations, it is possible to realize an optical apparatus and an imaging apparatus which have excellent optical performance and a focusing lens group reduced in weight in order to attain high speed focusing operation.

According to an embodiment of the present invention, there is provided a method for manufacturing a variable magnification optical system comprising steps of arranging a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power such that, upon varying magnification, a distance between the first lens group and the intermediate group, a distance between the intermediate group and the focusing group and a distance between the focusing group and the image side group are varied; and arranging such that the image side group is composed of, in order from an object side, an A group having positive refractive power, a B group satisfying the following conditional expression (1) with respect to the A group and having negative refractive power, and a C group:

$$1.67 < fA/(-fB) < 2.80 \tag{1}$$

where fA denotes a focal length of the A group, and fB denotes a focal length of the B group.

With such configurations, it is possible to manufacture a variable magnification optical system which has excellent optical performance and a focusing lens group reduced in weight in order to attain high speed focusing operation.

Hereinafter, examples relating to a variable magnification optical system according to an embodiment of the present invention will be explained with reference to the accompanying drawings.

First Example

FIG. 1 is a sectional view of a variable magnification optical system according to a First Example. Note that each arrow in FIG. 1 and FIGS. 5, 9, 13, 17, 21, 25 and 29 as described later indicates moving trajectory of each lens group upon varying magnification from the wide angle end state (W) to the telephoto end state (T).

The variable magnification optical system according to the First Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a double convex positive lens L44 cemented with a double concave negative lens L45.

The C group G4C consists of, in order from the object side, a double convex positive lens L46, and a negative meniscus lens L47 having a concave surface facing the object side.

In the variable magnification optical system according to the First Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the First Example, the third lens group G3 is moved toward an image side along the optical axis, as the focusing lens group, thereby focusing from an infinitely distant object to a close distance object.

In the variable magnification optical system according to the First Example, the B group G4B is moved, as a vibration reduction group, to have a component in a direction perpendicular to the optical axis, thereby carrying out vibration reduction. Meanwhile, upon carrying out vibration reduction, positions of the A group G4A and the C group G4C in a direction perpendicular to the optical axis are fixed.

It is noted that in a lens having a focal length f of the whole lens system and a vibration reduction coefficient K (a ratio of a moving amount of an image on the image plane I to a moving amount of the vibration reduction group), it is possible to correct a rotational camera shake of an angle θ, by moving the vibration reduction group by the amount of (f·tan θ)/K perpendicularly to the optical axis. Accordingly, in the variable magnification optical system according to the First Example, in the wide angle end state, the vibration reduction coefficient is 1.06, and the focal length is 71.40 (mm), so that the moving amount of the B group G4B for correcting a rotational camera shake of 0.30 degrees is 0.35 (mm). In the telephoto end state, the vibration reduction coefficient is 1.86, and the focal length is 294.00 (mm), so that the moving amount of the B group G4B for correcting a rotational camera shake of 0.20 degrees is 0.55 (mm).

Table 1 below shows various values of the variable magnification optical system according to the First Example.

In table 1, "f" denotes a focal length, and "BF" denotes a back focal length (a distance on the optical axis between a most image side lens surface and the image plane I).

In [Surface Data], a surface number denotes an order of an optical surface counted from the object side, "r" denotes a radius of curvature, "d" denotes a surface-to-surface distance (a distance from an n-th surface to an (n+1)-th surface, where n is an integer), "nd" denotes refractive index for d-line (wavelength 587.6 nm) and "vd" denotes an Abbe number for d-line (wavelength 587.6 nm). Further, "Object Plane" denotes an object surface, "variable" denotes a variable surface-to-surface distance, "Stop S" denotes an aperture stop, and "I" denotes an image plane. Meanwhile, radius of curvature r=∞ denotes a plane surface. Refractive index of air nd=1.00000 is omitted.

In [Various Data], "FNO" denotes an F-number, "2ω" denotes an angle of view (unit "°"), "Ymax" denotes a maximum image height, "TL" denotes a total length of the variable magnification optical system according to the First Example (a distance along the optical axis from the first surface to the image plane I), and "dn" denotes a variable distance between an n-th surface and an (n+1)-th surface. Meanwhile, "W" denotes a wide angle end state, "M" denotes an intermediate focal length state, "T" denotes a telephoto end state, "Infinitely distant" denotes a time when focusing on an infinitely distant object is conducted, and "Close distance" denotes a time when focusing on a close distance object is conducted.

In [Lens Group Data], a starting surface and a focal length for each lens group are shown.

In [Values for Conditional Expressions], values corresponding to respective conditional expressions of the variable magnification optical system according to the First Example are shown.

Here, that "mm" is generally used for the unit of length such as the focal length f, the radius of curvature r and the unit for other lengths shown in Table 1. However, since similar optical performance can be obtained by an optical system proportionally enlarged or reduced in its dimension, the unit is not necessarily to be limited to "mm".

The reference symbols in Table 1 described above, are used in the same way in Tables for the other Examples.

TABLE 1

First Example

[Surface Data]

| Surface number | r | d | nd | νd |
|---|---|---|---|---|
| Object Plane | ∞ | | | |
| 1 | 72.3688 | 6.972 | 1.51680 | 63.88 |
| 2 | −604.5951 | 0.499 | | |
| 3 | 88.4675 | 1.500 | 1.62004 | 36.40 |
| 4 | 32.5526 | 8.844 | 1.51680 | 63.88 |
| 5 | 149.4554 | variable | | |
| 6 | −453.8182 | 1.000 | 1.69680 | 55.52 |
| 7 | 18.7304 | 3.761 | 1.80518 | 25.45 |
| 8 | 40.0562 | 3.501 | | |
| 9 | −33.7169 | 1.000 | 1.69680 | 55.52 |
| 10 | 3769.5898 | variable | | |
| 11 | 91.7620 | 4.268 | 1.51680 | 63.88 |
| 12 | −46.5887 | variable | | |
| 13 | 54.6217 | 5.361 | 1.48749 | 70.31 |
| 14 | −31.8367 | 1.000 | 1.85026 | 32.35 |
| 15 | 829.9126 | 0.200 | | |
| 16 | 34.8197 | 4.124 | 1.48749 | 70.31 |
| 17 | −190.4880 | 1.633 | | |
| 18 (Stop S) | ∞ | 27.478 | | |
| 19 | 316.7035 | 2.575 | 1.80518 | 25.45 |
| 20 | −37.0122 | 1.000 | 1.74400 | 44.81 |
| 21 | 28.1012 | 3.267 | | |
| 22 | 27.6380 | 3.921 | 1.54814 | 45.79 |
| 23 | −54.2282 | 2.418 | | |
| 24 | −22.4640 | 1.000 | 1.77250 | 49.62 |
| 25 | −55.2971 | BF | | |
| Image Plane | ∞ | | | |

[Various Data]
Variable magnification ratio 4.12

| | W | M | T |
|---|---|---|---|
| f | 71.4 | 105.0 | 294.0 |
| FNO | 4.17 | 4.18 | 6.38 |
| 2ω | 22.84 | 15.30 | 5.48 |
| Ymax | 14.25 | 14.25 | 14.25 |
| TL | 166.32 | 183.64 | 219.32 |
| BF | 38.52 | 38.53 | 73.71 |
| Infinitely distant | | | |
| d5 | 3.555 | 24.790 | 43.361 |
| d10 | 26.610 | 21.614 | 2.000 |
| d12 | 12.316 | 13.381 | 14.933 |
| Close distance | | | |
| d5 | 3.555 | 24.790 | 43.361 |
| d10 | 27.368 | 22.723 | 3.114 |
| d12 | 11.558 | 12.271 | 13.819 |

[Lens Group Data]

| Group | Starting Surface | f |
|---|---|---|
| 1 | 1 | 115.478 |
| 2 | 6 | −26.653 |
| 3 | 11 | 60.427 |
| 4 | 13 | 138.481 |

[Values for Conditional Expression]

| (1) | fA/(−fB) = 1.717 |
|---|---|
| (1A) | f1/(−fc) = 4.333 |
| (1B) | f1fw/ff = 6.400 |
| (2) | f1/ff = 1.911 |
| (3) | ff/fi = 0.436 |
| (4) | fi/(−fB) = 3.064 |

TABLE 1-continued

First Example

| (5) | νFP = 63.88 |
|---|---|
| (6) | ff/ft = 0.206 |

Figure 2A:
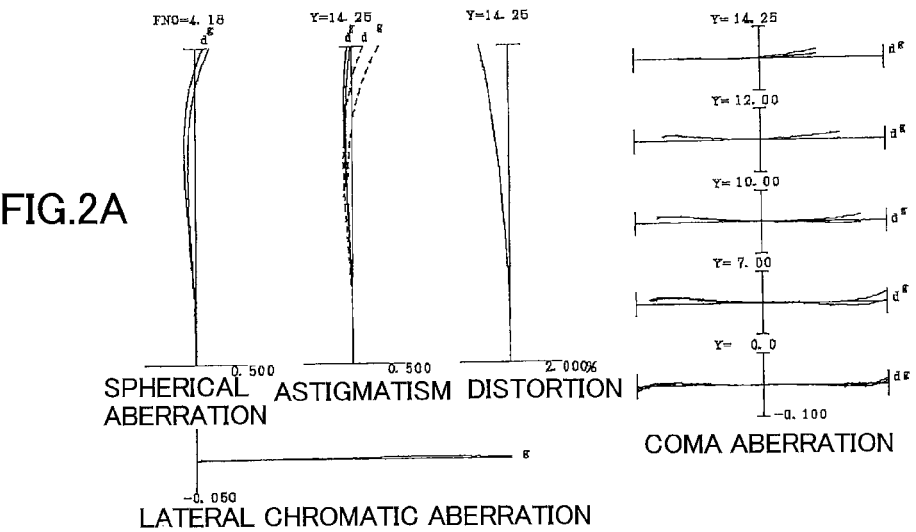
FIGS. 2A, 2B and 2C are graphs showing various aberrations of the variable magnification optical system according to the First Example.
Figure 2B:
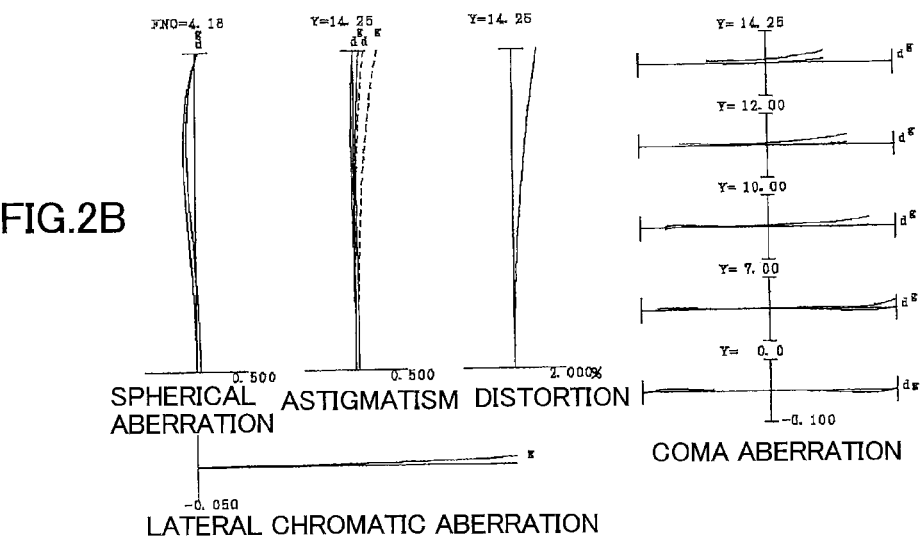
Figure 2C:
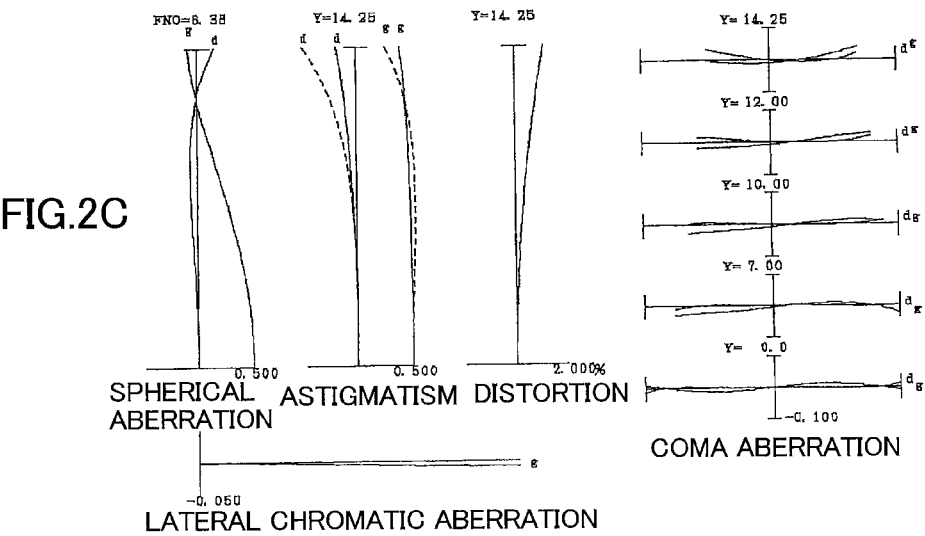

FIGS. 2A, 2B and 2C are graphs showing various aberrations of the variable magnification optical system according to the First Example upon focusing on an infinitely distant object, in which FIG. 2A is in a wide angle end state, FIG. 2B is in an intermediate focal length state, and FIG. 2C is in the telephoto end state.

Figure 3A:
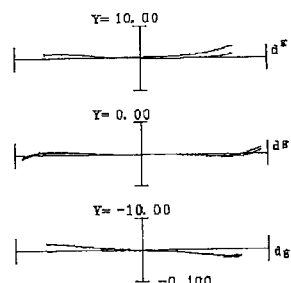
FIGS. 3A and 3B are graphs showing meridional transverse aberrations of the variable magnification optical system according to the First Example.
Figure 3B:
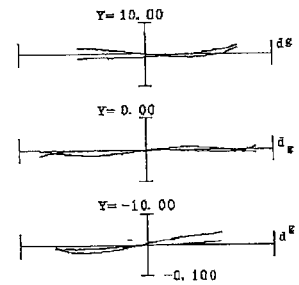

FIG. 3A is a graph showing meridional transverse aberration of the variable magnification optical system according to the First Example upon focusing on an infinitely distant object in the wide angle end state with carrying out vibration reduction against a rotational camera shake of 0.30 degrees, and FIG. 3B is a graph showing meridional transverse aberration of the variable magnification optical system according to the First Example upon focusing on an infinitely distant object in the telephoto end state with carrying out vibration reduction against a rotational camera shake of 0.20 degrees.

Figure 4A:
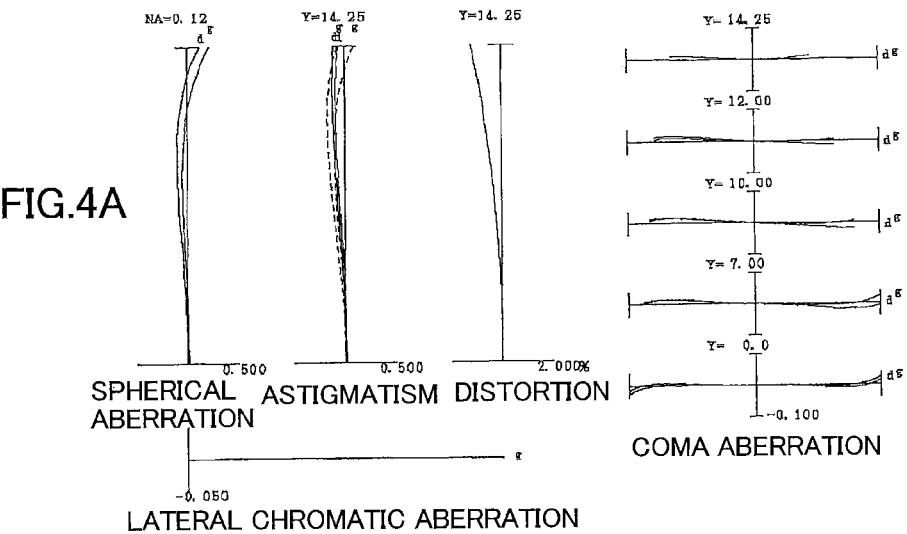
FIGS. 4A, 4B and 4C are graphs showing various aberrations of the variable magnification optical system according to the First Example.
Figure 4B:
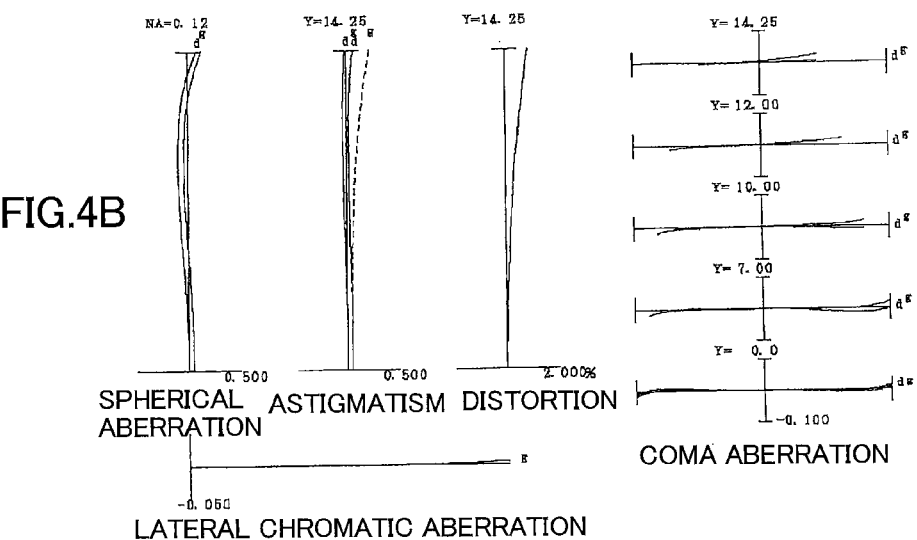
Figure 4C:
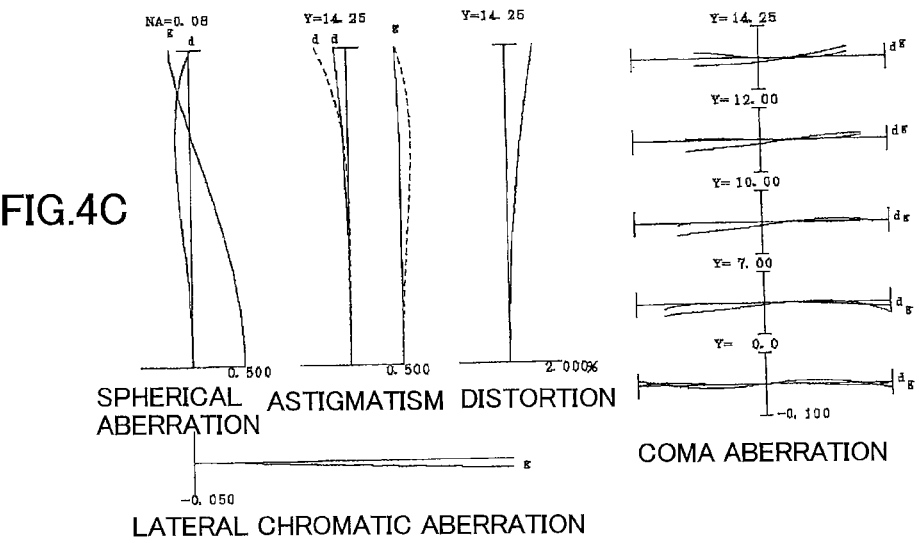

FIGS. 4A, 4B and 4C are graphs showing various aberrations of the variable magnification optical system according to the First Example upon focusing on a close distance object, in which FIG. 4A is in the wide angle end state, FIG. 4B is in the intermediate focal length state, and FIG. 4C is in the telephoto end state.

In respective aberration graphs, FNO denotes an F-number, Y denotes an image height, and NA denotes a numerical aperture. For more information, there are shown a value of F-number FNO or numerical aperture NA corresponding to the maximum diameter in a spherical aberration graph, the maximum value of the image height Y in each of an astigmatism graph and a distortion graph, and a value of each image height in a coma aberration graph. Additionally, in respective aberration graphs, d denotes an aberration at d-line (wavelength 587.6 nm), and g denotes an aberration at g-line (wavelength 435.8 nm). In the astigmatism graph, a solid line indicates a sagittal image plane, and a broken line indicates a meridional image plane. The coma aberration graph shows a coma aberration for each image height Y. Incidentally, the same symbols as used in the First Example are employed in the other Examples as described later.

As is apparent from the respective aberration graphs, the variable magnification optical system according to the First Example shows superb imaging performance as a result of good corrections to various aberrations in the wide angle end state to the telephoto end state, and also shows superb imaging performance upon carrying out vibration reduction and upon focusing on a close distance object.

Second Example

FIG. 5 is a sectional view of a variable magnification optical system according to a Second Example.

The variable magnification optical system according to the Second Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45 and a negative meniscus lens L46 having a concave surface facing the object side.

In the variable magnification optical system according to the Second Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Second Example, the third lens group G3 is moved toward an image side along the optical axis, as the focusing lens group, thereby focusing from an infinitely distant object to a close distance object.

In the variable magnification optical system according to the Second Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Second Example, in the wide angle end state, the vibration reduction coefficient is 1.17, and the focal length is 71.35 (mm), so that the moving amount of the B group G4B for correcting a rotational camera shake of 0.30 degrees is 0.32 (mm). In the telephoto end state, the vibration reduction coefficient is 1.80, and the focal length is 294.00 (mm), so that the moving amount of the B group G4B for correcting a rotational camera shake of 0.20 degrees is 0.57 (mm).

Table 2 below shows various values of the variable magnification optical system according to the Second Example.

TABLE 2

Second Example

[Surface Data]

| Surface number | r | d | nd | vd |
|---|---|---|---|---|
| Object Plane | ∞ | | | |
| 1 | 84.0136 | 6.369 | 1.51680 | 63.88 |
| 2 | −569.5201 | 0.287 | | |
| 3 | 111.7962 | 1.500 | 1.62004 | 36.40 |
| 4 | 36.8295 | 8.708 | 1.51680 | 63.88 |
| 5 | 239.6437 | variable | | |
| 6 | −196.3998 | 1.000 | 1.69680 | 55.52 |
| 7 | 17.8250 | 4.472 | 1.80518 | 25.45 |
| 8 | 63.8758 | 2.220 | | |
| 9 | −50.1550 | 1.000 | 1.80100 | 34.92 |
| 10 | 107.3132 | variable | | |
| 11 | 98.4276 | 3.799 | 1.51680 | 63.88 |
| 12 | −44.7987 | variable | | |
| 13 | 33.5689 | 5.221 | 1.48749 | 70.31 |
| 14 | −34.6171 | 1.000 | 1.75520 | 27.57 |
| 15 | −464.1612 | 1.880 | | |
| 16 (Stop S) | ∞ | 31.253 | | |
| 17 | −215.7008 | 3.558 | 1.80610 | 40.97 |
| 18 | −18.9067 | 1.000 | 1.69680 | 55.52 |
| 19 | 29.6933 | 2.000 | | |
| 20 | 25.4517 | 4.902 | 1.51742 | 52.20 |
| 21 | −34.1288 | 6.212 | | |
| 22 | −19.1689 | 1.000 | 1.77250 | 49.62 |
| 23 | −46.3649 | BF | | |
| Image Plane | ∞ | | | |

[Various Data]
Variable magnification ratio 4.12

| | W | M | T |
|---|---|---|---|
| f | 71.4 | 105.0 | 294.0 |
| FNO | 4.70 | 4.74 | 6.44 |
| 2ω | 22.84 | 15.30 | 5.46 |
| Ymax | 14.25 | 14.25 | 14.25 |
| TL | 167.32 | 188.67 | 222.32 |
| BF | 38.52 | 39.12 | 64.52 |
| Infinitely distant | | | |
| d5 | 3.000 | 27.419 | 53.254 |
| d10 | 29.124 | 23.882 | 2.000 |
| d12 | 9.294 | 10.871 | 15.165 |
| Close distance | | | |
| d5 | 3.000 | 27.419 | 53.254 |
| d10 | 29.965 | 25.078 | 3.487 |
| d12 | 8.453 | 9.675 | 13.679 |

[Lens Group Data]

| Group | Starting Surface | f |
|---|---|---|
| 1 | 1 | 128.484 |
| 2 | 6 | −29.436 |
| 3 | 11 | 60.115 |
| 4 | 13 | 180.542 |

[Values for Conditional Expression]

| (1) | fA/(−fB) = 2.468 |
|---|---|
| (1A) | f1/(−fc) = 4.365 |
| (1B) | f1fw/ff = 3.954 |
| (2) | f1/ff = 2.137 |
| (3) | ff/fi = 0.333 |
| (4) | fi/(−fB) = 3.886 |
| (5) | vFP = 63.88 |
| (6) | ff/ft = 0.204 |

Figure 6A:
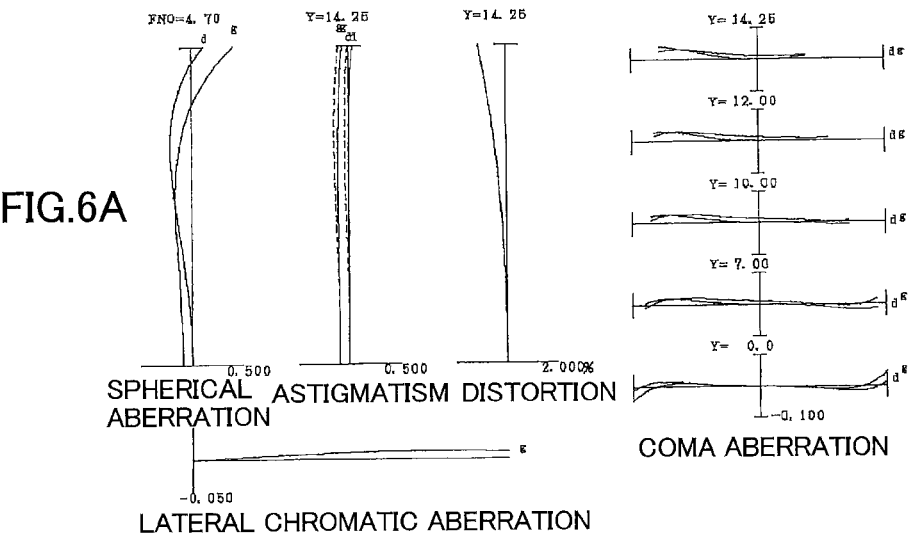
FIGS. 6A, 6B and 6C are graphs showing various aberrations of the variable magnification optical system according to the Second Example.
Figure 6B:
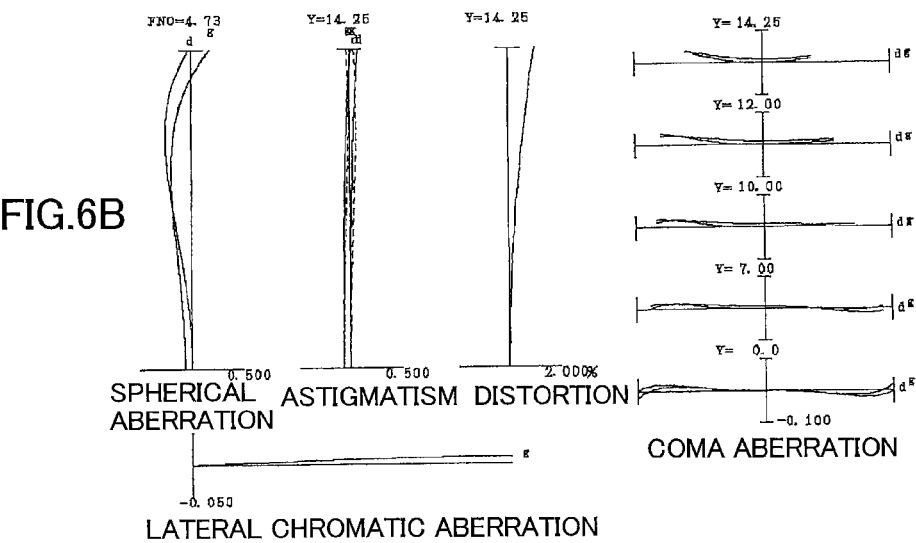
Figure 6C:
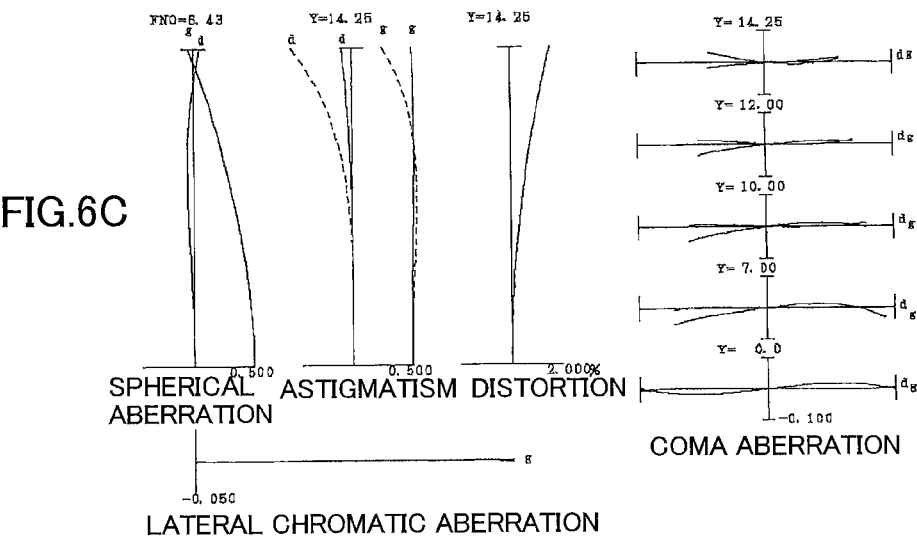

FIGS. 6A, 6B and 6C are graphs showing various aberrations of the variable magnification optical system according to the Second Example upon focusing on an infinitely distant object, in which FIG. 6A is in a wide angle end state, FIG. 6B is in an intermediate focal length state, and FIG. 6C is in a telephoto end state.

Figure 7A:
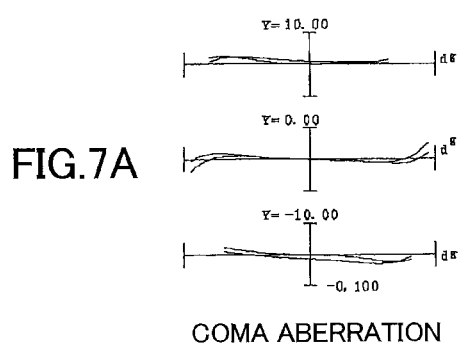
FIGS. 7A and 7B are graphs showing meridional transverse aberrations of the variable magnification optical system according to the Second Example.
Figure 7B:
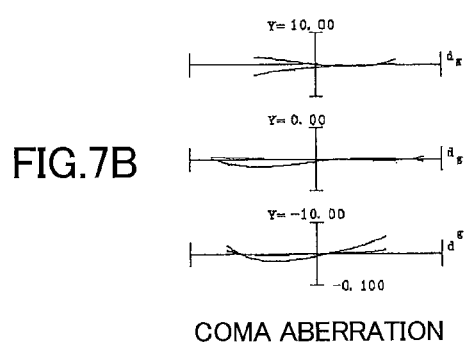

FIG. 7A is a graph showing meridional transverse aberration of the variable magnification optical system according to the Second Example upon focusing on an infinitely distant object in the wide angle end state with carrying out vibration reduction against a rotational camera shake of 0.30 degrees, and FIG. 7B is a graph showing meridional transverse aberration of the variable magnification optical system according to the Second Example upon focusing on an infinitely distant object in the telephoto end state with carrying out vibration reduction against a rotational camera shake of 0.20 degrees.

Figure 8A:
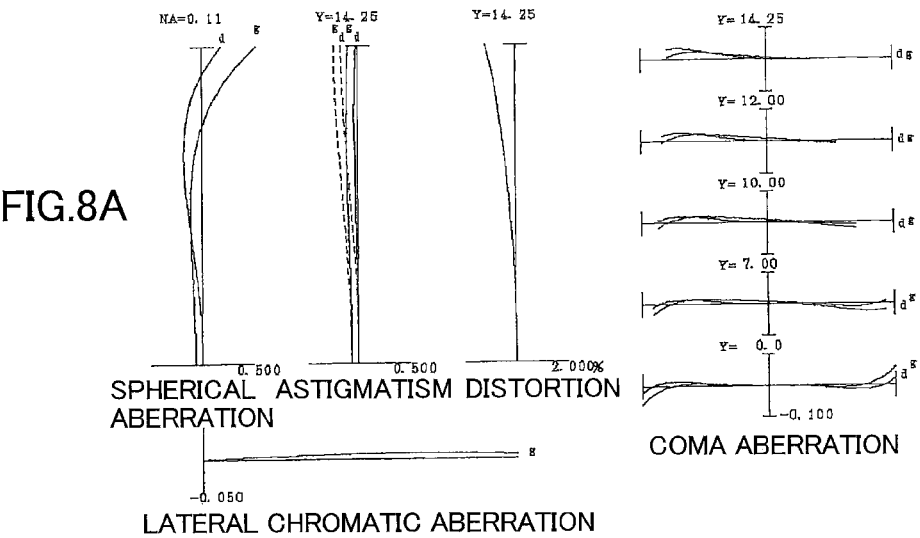
FIGS. 8A, 8B and 8C are graphs showing various aberrations of the variable magnification optical system according to the Second Example.
Figure 8B:
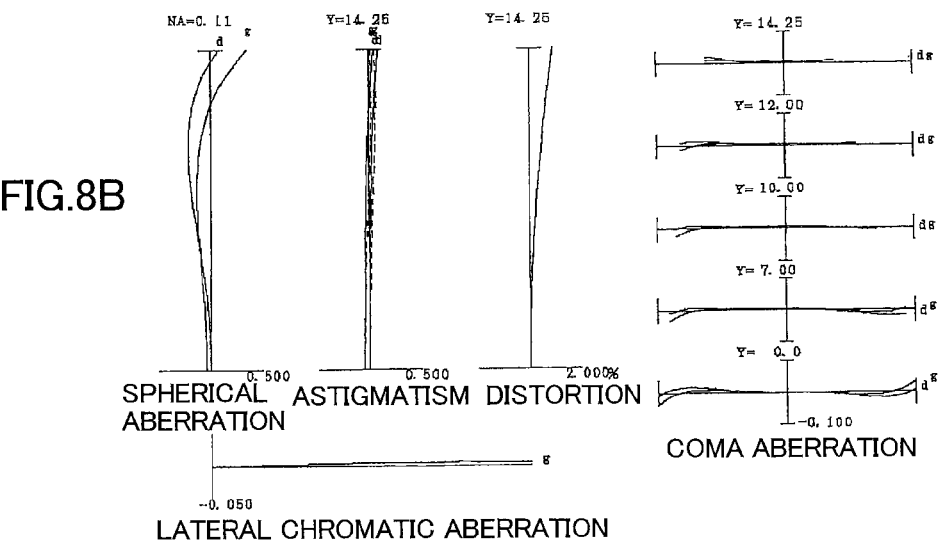
Figure 8C:
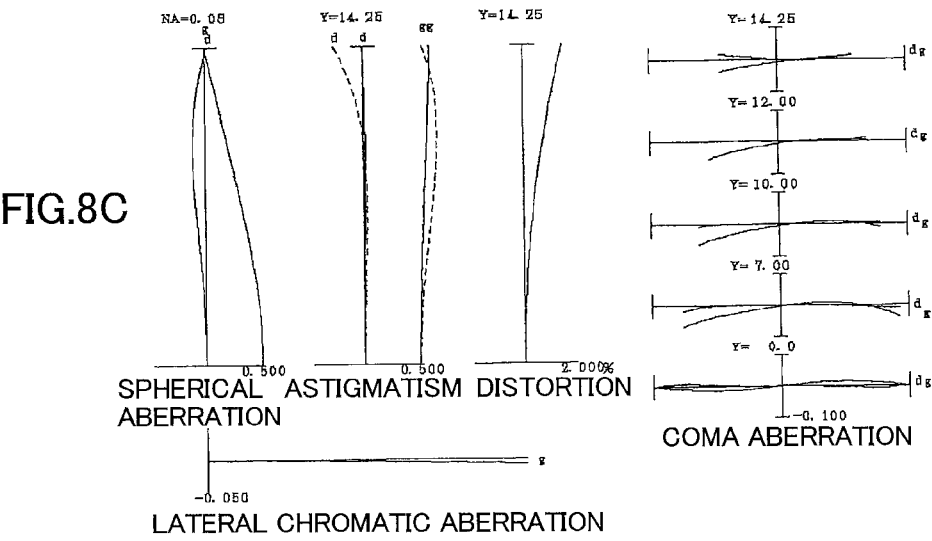

FIGS. 8A, 8B and 8C are graphs showing various aberrations of the variable magnification optical system according to the Second Example upon focusing on a close distance object, in which FIG. 8A is in the wide angle end state, FIG. 8B is in the intermediate focal length state, and FIG. 8C is in the telephoto end state.

As is apparent from the respective aberration graphs, the variable magnification optical system according to the Second Example shows superb imaging performance as a result of good corrections to various aberrations in the wide angle end state to the telephoto end state, and also shows superb imaging performance upon carrying out vibration reduction and upon focusing on a close distance object.

Third Example

FIG. 9 is a sectional view of a variable magnification optical system according to a Third Example.

The variable magnification optical system according to the Third Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45, and a cemented negative lens constructed by a double concave negative lens L46 cemented with a double convex positive lens L47.

In the variable magnification optical system according to the Third Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Third Example, the third lens group G3 is moved toward an image side along the optical axis, as the focusing lens group, thereby focusing from an infinitely distant object to a close distance object.

In the variable magnification optical system according to the Third Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Third Example, in the wide angle end state, the vibration reduction coefficient is 1.22, and the focal length is 71.40 (mm), so that the moving amount of the B group G4B for correcting a rotational camera shake of 0.30 degrees is 0.31 (mm). In the telephoto end state, the vibration reduction coefficient is 1.79, and the focal length is 294.00 (mm), so that the moving amount of the B group G4B for correcting a rotational camera shake of 0.20 degrees is 0.57 (mm).

Table 3 below shows various values of the variable magnification optical system according to the Third Example.

TABLE 3

Third Example

[Surface Data]

| Surface number | r | d | nd | vd |
|---|---|---|---|---|
| Object Plane | ∞ | | | |
| 1 | 85.0462 | 5.776 | 1.51680 | 63.88 |
| 2 | −660.6172 | 0.468 | | |
| 3 | 127.3802 | 1.500 | 1.62004 | 36.40 |
| 4 | 39.1726 | 7.903 | 1.51680 | 63.88 |
| 5 | 338.5447 | variable | | |
| 6 | −132.1891 | 1.000 | 1.69680 | 55.52 |
| 7 | 19.2602 | 4.667 | 1.80518 | 25.45 |
| 8 | 76.0183 | 2.071 | | |
| 9 | −54.4201 | 1.000 | 1.80100 | 34.92 |
| 10 | 119.2030 | variable | | |
| 11 | 101.6158 | 3.707 | 1.51680 | 63.88 |
| 12 | −48.1136 | variable | | |
| 13 | 32.8274 | 5.339 | 1.48749 | 70.31 |
| 14 | −36.1413 | 1.000 | 1.80518 | 25.45 |
| 15 | −208.8127 | 1.719 | | |
| 16 (Stop S) | ∞ | 20.897 | | |
| 17 | −111.8106 | 3.901 | 1.66755 | 41.87 |
| 18 | −18.5066 | 1.000 | 1.58913 | 61.22 |
| 19 | 35.2076 | 2.000 | | |
| 20 | 26.2172 | 5.000 | 1.48749 | 70.31 |

TABLE 3-continued

Third Example

| 21 | −44.8232 | 10.387 | | |
|---|---|---|---|---|
| 22 | −18.5590 | 1.000 | 1.77250 | 49.62 |
| 23 | 39.9065 | 4.006 | 1.60342 | 38.03 |
| 24 | −29.6411 | BF | | |
| Image Plane | ∞ | | | |

[Various Data]
Variable magnification ratio 4.12

| | W | M | T |
|---|---|---|---|
| f | 71.4 | 105.0 | 294.0 |
| FNO | 4.68 | 4.76 | 6.45 |
| 2ω | 22.80 | 15.28 | 5.44 |
| Ymax | 14.25 | 14.25 | 14.25 |
| TL | 166.39 | 188.89 | 221.32 |
| BF | 38.52 | 39.12 | 64.52 |

Infinitely distant

| d5 | 3.000 | 27.909 | 54.414 |
|---|---|---|---|
| d10 | 30.861 | 25.246 | 2.000 |
| d12 | 9.676 | 12.274 | 16.047 |

Close distance

| d5 | 3.000 | 27.909 | 54.414 |
|---|---|---|---|
| d10 | 31.772 | 26.533 | 3.581 |
| d12 | 8.765 | 10.987 | 14.466 |

[Lens Group Data]

| Group | Starting Surface | f |
|---|---|---|
| 1 | 1 | 130.814 |
| 2 | 6 | −30.984 |
| 3 | 11 | 63.720 |
| 4 | 13 | 184.004 |

[Values for Conditional Expression]

| (1) | fA/(−fB) = 1.836 |
|---|---|
| (1A) | f1/(−fc) = 4.222 |
| (1B) | f1fw/ff = 3.924 |
| (2) | f1/ff = 2.063 |
| (3) | ff/fi = 0.345 |
| (4) | fi/(−fB) = 3.433 |
| (5) | vFP = 63.88 |
| (6) | ff/ft = 0.216 |

Figure 10A:
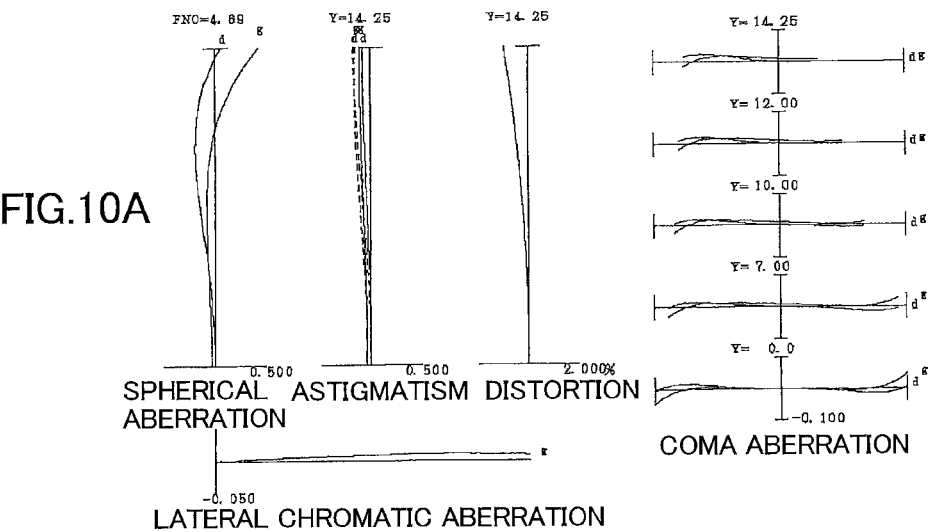
FIGS. 10A, 10B and 10C are graphs showing various aberrations of the variable magnification optical system according to the Third Example.
Figure 10B:
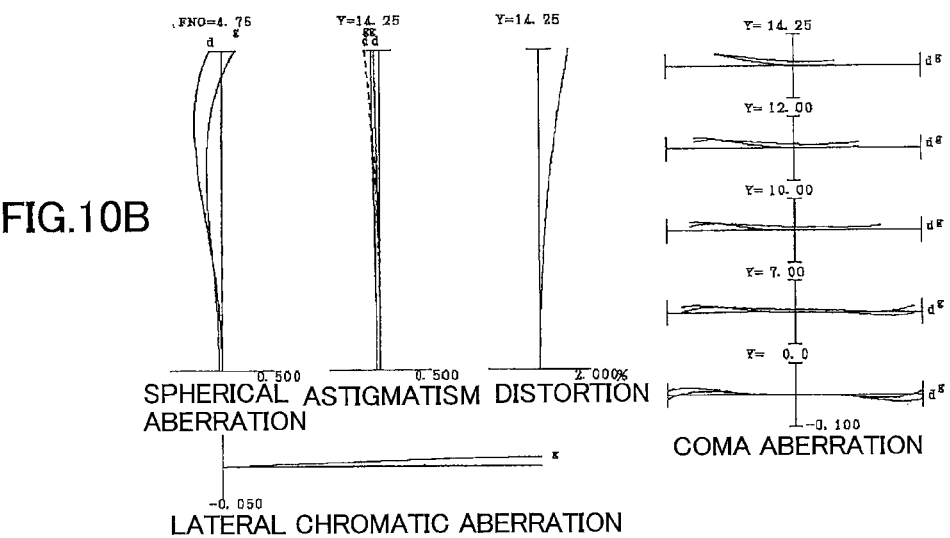
Figure 10C:
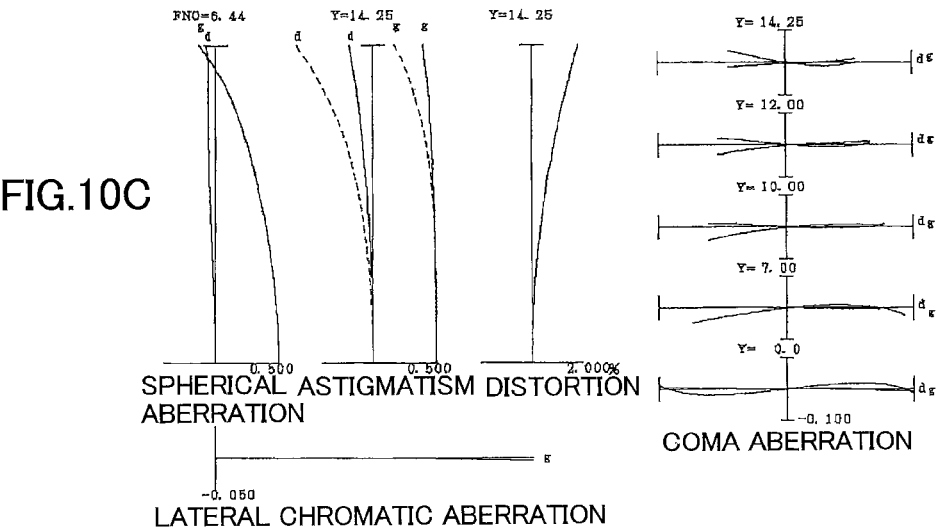

FIGS. 10A, 10B and 10C are graphs showing various aberrations of the variable magnification optical system according to the Third Example upon focusing on an infinitely distant object, in which FIG. 10A is in a wide angle end state, FIG. 10B is in an intermediate focal length state, and FIG. 10C is in a telephoto end state.

FIG. 11A is a graph showing meridional transverse aberration of the variable magnification optical system according to the Third Example upon focusing on an infinitely distant object in the wide angle end state with carrying out vibration reduction against a rotational camera shake of 0.30 degrees, and FIG. 11B is a graph showing meridional transverse aberration of the variable magnification optical system according to the Third Example upon focusing on an infinitely distant object in the telephoto end state with carrying out vibration reduction against a rotational camera shake of 0.20 degrees.

Figure 12A:
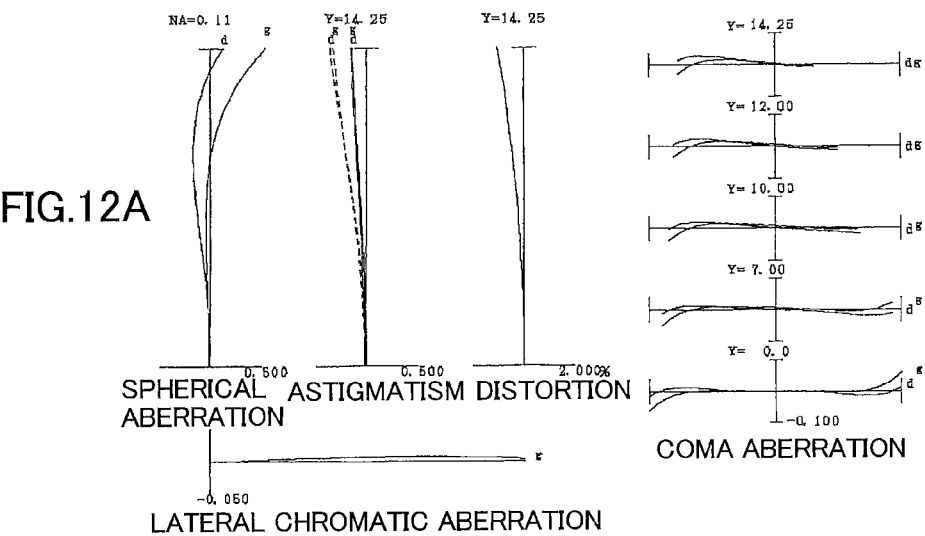
FIGS. 12A, 12B and 12C are graphs showing various aberrations of the variable magnification optical system according to the Third Example.
Figure 12B:
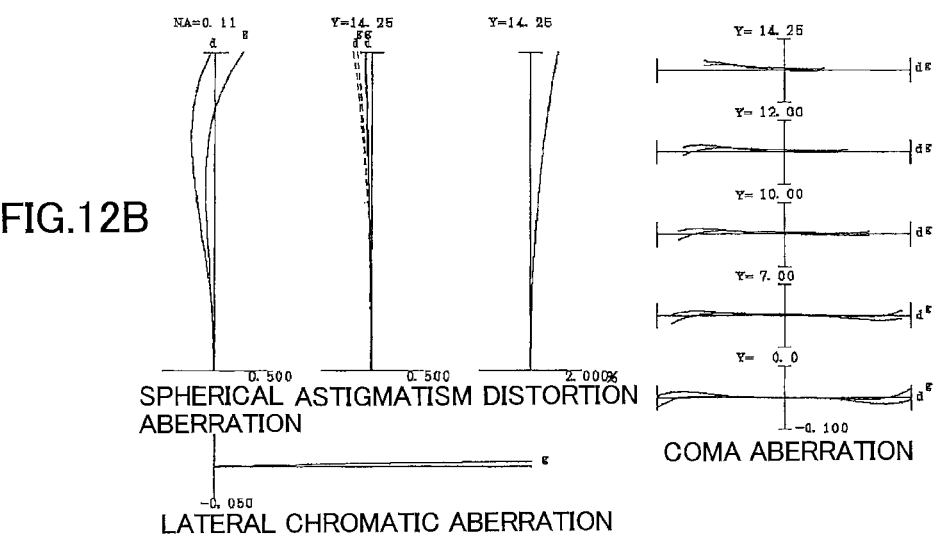
Figure 12C:
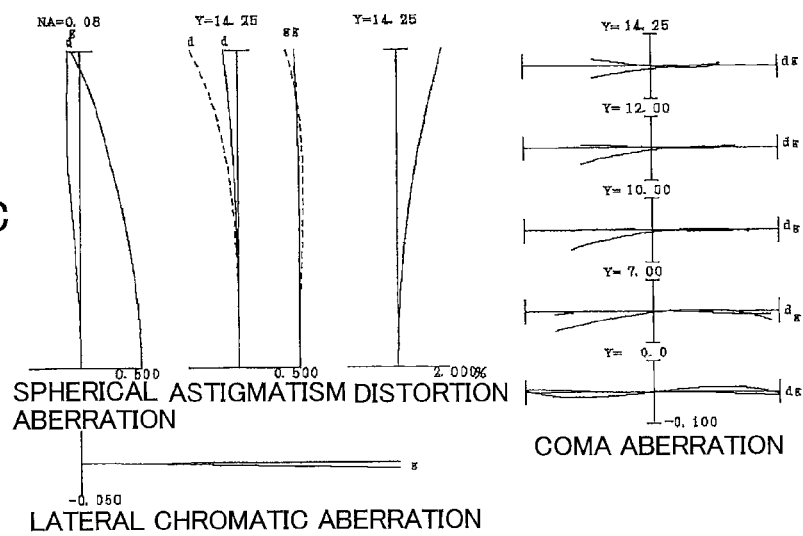

FIGS. 12A, 12B and 12C are graphs showing various aberrations of the variable magnification optical system according to the Third Example upon focusing on a close distance object, in which FIG. 12A is in the wide angle end state, FIG. 12B is in the intermediate focal length state, and FIG. 12C is in the telephoto end state.

As is apparent from the respective aberration graphs, the variable magnification optical system according to the Third Example shows superb imaging performance as a result of good corrections to various aberrations in the wide angle end state to the telephoto end state, and also shows superb imaging performance upon carrying out vibration reduction and upon focusing on a close distance object.

Fourth Example

Figure 13:
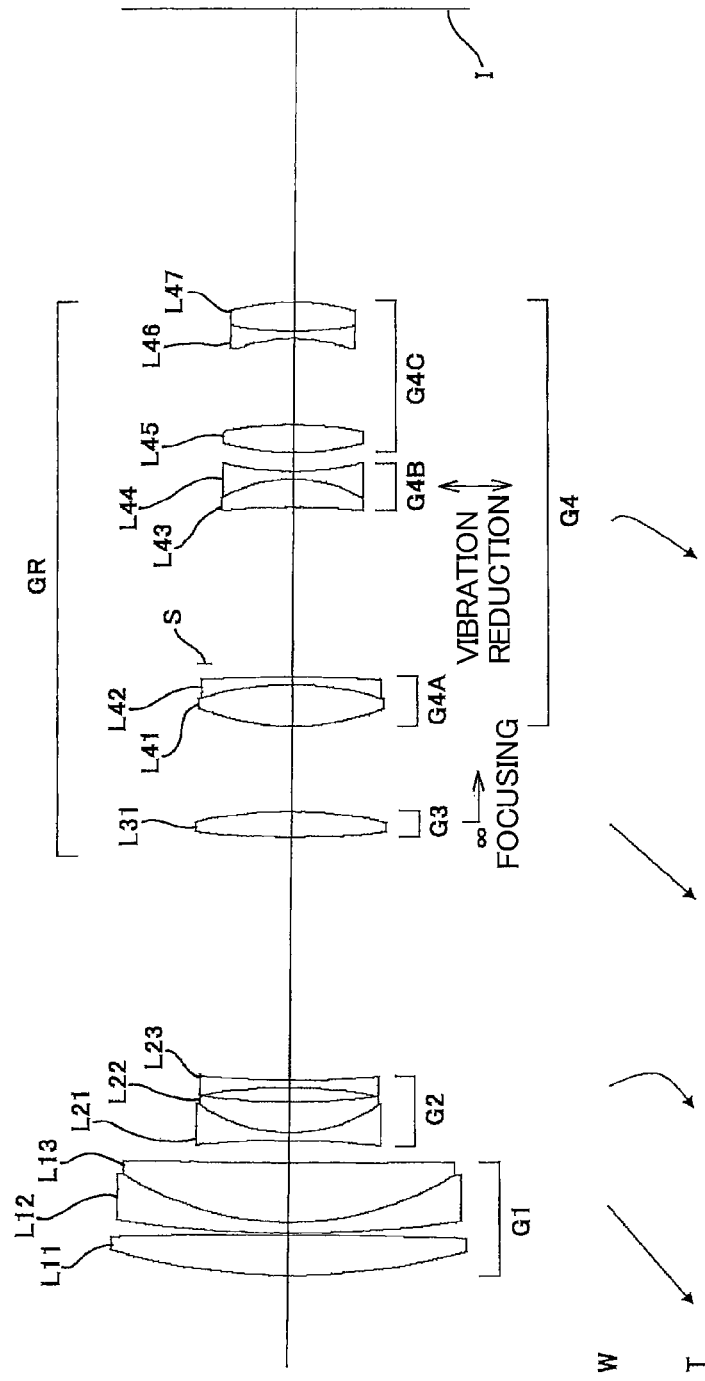
FIG. 13 is a sectional view of a variable magnification optical system according to a Fourth Example.

FIG. 13 is a sectional view of a variable magnification optical system according to a Fourth Example.

The variable magnification optical system according to the Fourth Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45, and a cemented negative lens constructed by a double concave negative lens L46 cemented with a double convex positive lens L47.

In the variable magnification optical system according to the Fourth Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Fourth Example, the third lens group G3 is moved toward an image side along the optical axis, as the focusing lens group, thereby focusing from an infinitely distant object to a close distance object.

In the variable magnification optical system according to the Fourth Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Fourth Example, in the wide angle end state, the vibration reduction coefficient is 1.21, and the focal length is 71.40 (mm), so that the moving amount of the B group G4B for correcting a rotational camera shake of 0.30 degrees is 0.31 (mm). In the telephoto end state, the vibration reduction coefficient is 1.79, and the focal length is 292.00 (mm), so that the moving amount of the B group G4B for correcting a rotational camera shake of 0.20 degrees is 0.57 (mm).

Table 4 below shows various values of the variable magnification optical system according to the Fourth Example.

TABLE 4

Fourth Example

[Surface Data]

| Surface number | r | d | nd | vd |
|---|---|---|---|---|
| Object Plane | ∞ | | | |
| 1 | 86.4475 | 5.443 | 1.51680 | 63.88 |
| 2 | −981.1690 | 0.200 | | |
| 3 | 146.3378 | 1.500 | 1.62004 | 36.40 |
| 4 | 41.2453 | 8.000 | 1.51680 | 63.88 |
| 5 | 1154.1773 | variable | | |
| 6 | −105.1301 | 1.000 | 1.69680 | 55.52 |
| 7 | 20.4832 | 4.124 | 1.80518 | 25.45 |
| 8 | 77.3629 | 1.964 | | |
| 9 | −62.6354 | 1.000 | 1.83400 | 37.18 |
| 10 | 142.2611 | variable | | |
| 11 | 123.7504 | 3.431 | 1.58913 | 61.22 |
| 12 | −57.1062 | variable | | |
| 13 | 33.8130 | 5.634 | 1.49700 | 81.73 |
| 14 | −38.7693 | 1.000 | 1.80518 | 25.45 |
| 15 | −194.5892 | 1.688 | | |
| 16 (Stop S) | ∞ | 21.000 | | |
| 17 | −99.8095 | 3.775 | 1.66755 | 41.87 |
| 18 | −18.8632 | 1.000 | 1.58913 | 61.22 |
| 19 | 36.8056 | 2.500 | | |
| 20 | 34.3226 | 3.724 | 1.51680 | 63.88 |
| 21 | −51.2601 | 11.445 | | |
| 22 | −20.6818 | 1.000 | 1.77250 | 49.62 |
| 23 | 51.2093 | 3.854 | 1.60342 | 38.03 |
| 24 | −30.0976 | BF | | |
| Image Plane | ∞ | | | |

[Various Data]
Variable magnification ratio 4.09

| | W | M | T |
|---|---|---|---|
| f | 71.4 | 100.0 | 292.0 |
| FNO | 4.70 | 4.69 | 6.48 |
| 2ω | 22.78 | 16.04 | 5.48 |
| Ymax | 14.25 | 14.25 | 14.25 |
| TL | 169.32 | 189.52 | 221.32 |
| BF | 39.12 | 38.52 | 66.12 |
| Infinitely distant | | | |
| d5 | 3.000 | 26.086 | 53.441 |
| d10 | 32.425 | 27.561 | 2.000 |
| d12 | 11.493 | 14.070 | 16.477 |
| Close distance | | | |
| d5 | 3.000 | 26.086 | 53.441 |
| d10 | 33.360 | 28.885 | 3.621 |
| d12 | 10.558 | 12.746 | 14.856 |

TABLE 4-continued

Fourth Example

[Lens Group Data]

| Group | Starting Surface | f |
|---|---|---|
| 1 | 1 | 128.221 |
| 2 | 6 | −31.614 |
| 3 | 11 | 66.796 |
| 4 | 13 | 176.525 |

[Values for Conditional Expression]

| (1) | fA/(−fB) = 1.691 |
| (1A) | f1/(−fc) = 4.056 |
| (1B) | f1fw/ff = 4.017 |
| (2) | f1/ff = 1.920 |
| (3) | ff/fi = 0.378 |
| (4) | fi/(−fB) = 3.308 |
| (5) | νFP = 61.22 |
| (6) | ff/ft = 0.229 |

Figure 14A:
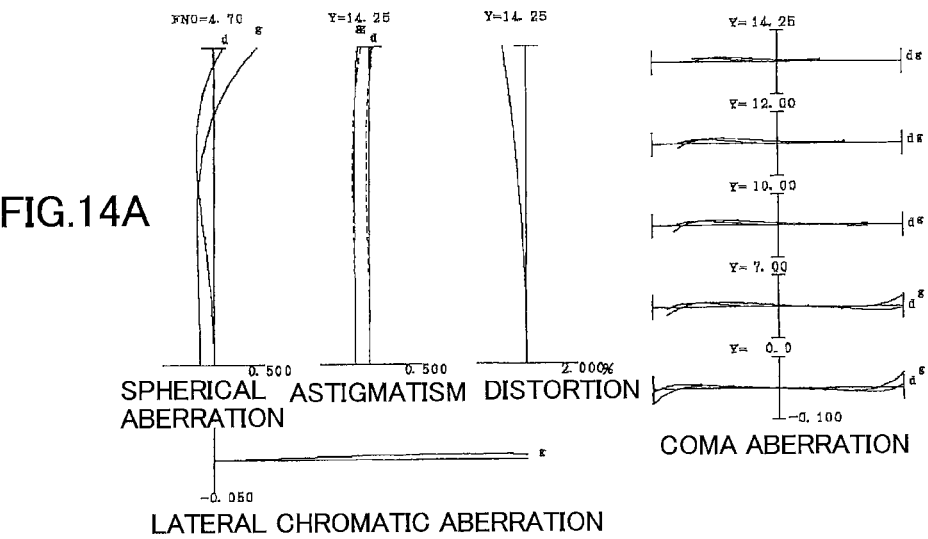
FIGS. 14A, 14B and 14C are graphs showing various aberrations of the variable magnification optical system according to the Fourth Example.
Figure 14B:
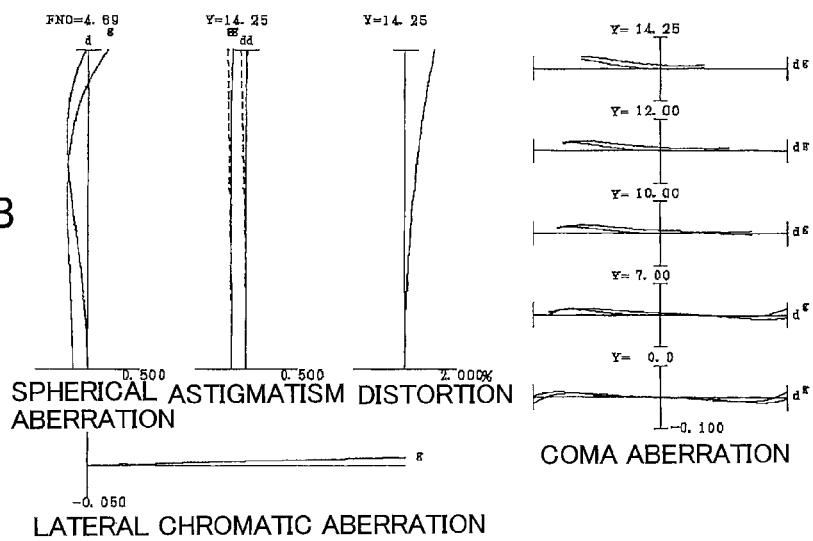
Figure 14C:
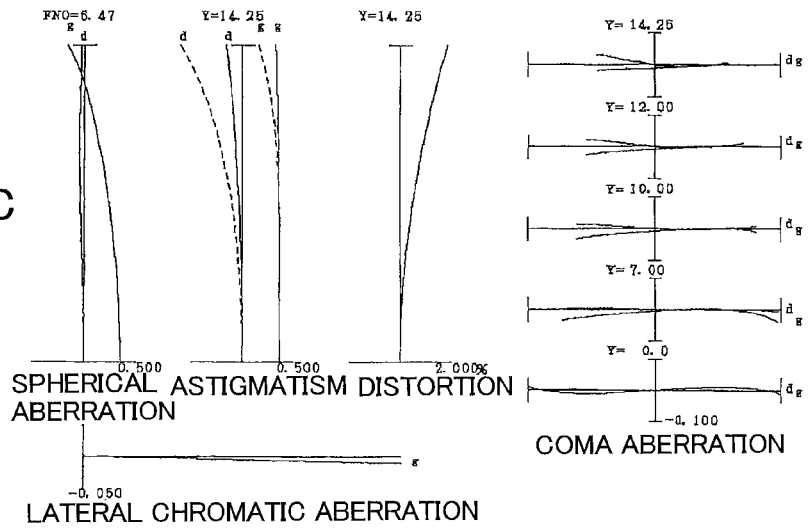

FIGS. 14A, 14B and 14C are graphs showing various aberrations of the variable magnification optical system according to the Fourth Example upon focusing on an infinitely distant object, in which FIG. 14A is in a wide angle end state, FIG. 14B is in an intermediate focal length state, and FIG. 14C is in a telephoto end state.

Figure 15A:
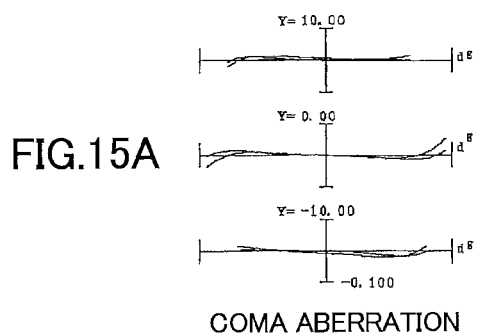
FIGS. 15A and 15B are graphs showing meridional transverse aberrations of the variable magnification optical system according to the Fourth Example.
Figure 15B:
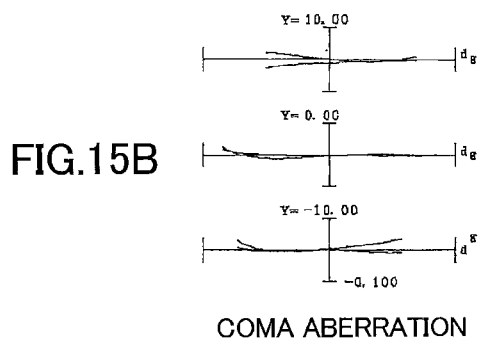

FIG. 15A is a graph showing meridional transverse aberration of the variable magnification optical system according to the Fourth Example upon focusing on an infinitely distant object in the wide angle end state with carrying out vibration reduction against a rotational camera shake of 0.30 degrees, and FIG. 15B is a graph showing meridional transverse aberration of the variable magnification optical system according to the Fourth Example upon focusing on an infinitely distant object in the telephoto end state with carrying out vibration reduction against a rotational camera shake of 0.20 degrees.

Figure 16A:
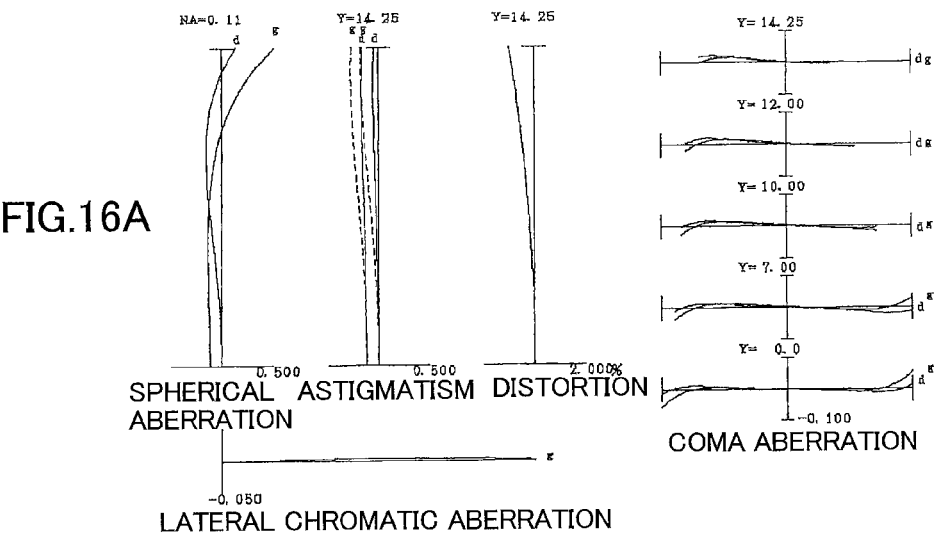
FIGS. 16A, 16B and 16C are graphs showing various aberrations of the variable magnification optical system according to the Fourth Example.
Figure 16B:
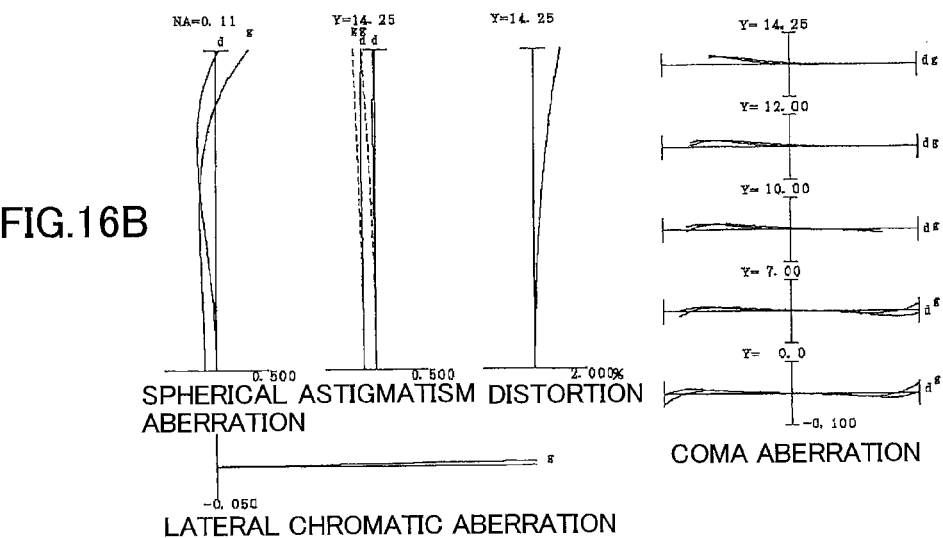
Figure 16C:
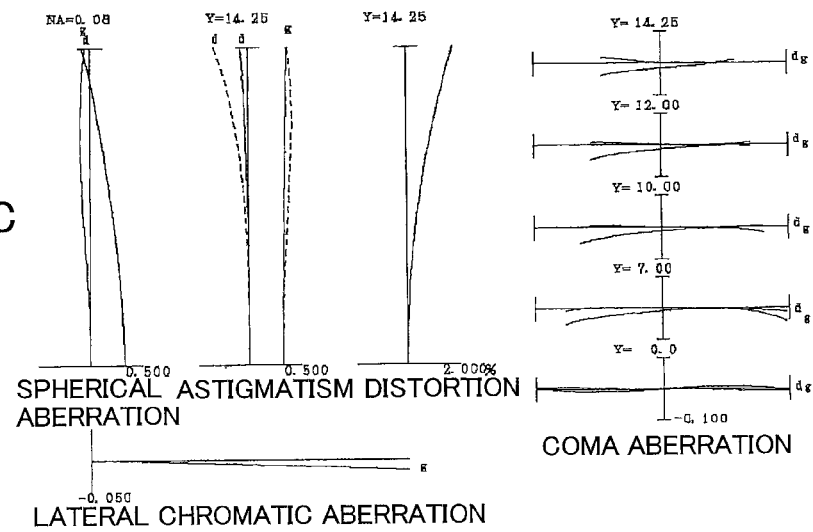

FIGS. 16A, 16B and 16C are graphs showing various aberrations of the variable magnification optical system according to the Fourth Example upon focusing on a close distance object, in which FIG. 16A is in the wide angle end state, FIG. 16B is in the intermediate focal length state, and FIG. 16C is in the telephoto end state.

As is apparent from the respective aberration graphs, the variable magnification optical system according to the Fourth Example shows superb imaging performance as a result of good corrections to various aberrations in the wide angle end state to the telephoto end state, and also shows superb imaging performance upon carrying out vibration reduction and upon focusing on a close distance object.

Fifth Example

Figure 17:
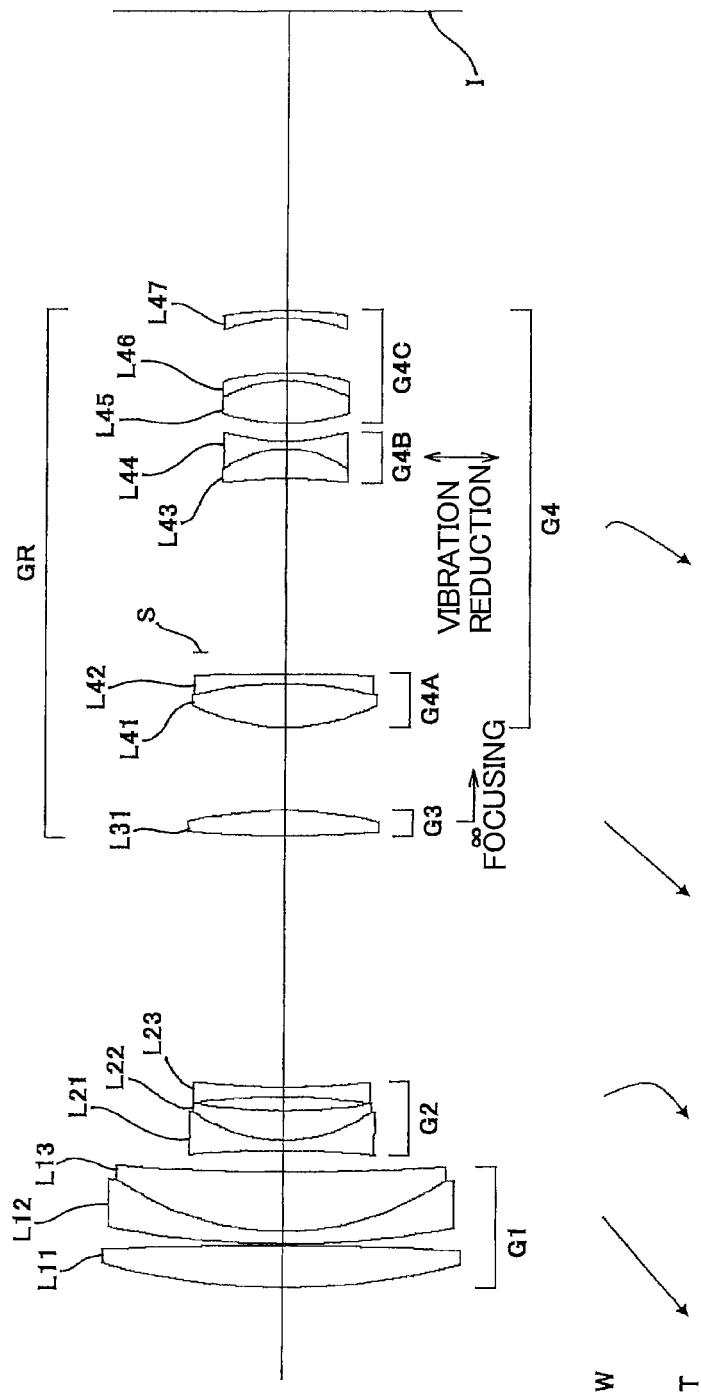
FIG. 17 is a sectional view of a variable magnification optical system according to a Fifth Example.

FIG. 17 is a sectional view of a variable magnification optical system according to a Fifth Example.

The variable magnification optical system according to the Fifth Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a cemented positive lens constructed by a double convex positive lens L45 cemented with a negative meniscus lens L46 having a concave surface facing the object side, and a negative meniscus lens L47 having a concave surface facing the object side.

In the variable magnification optical system according to the Fifth Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Fifth Example, the third lens group G3 is moved toward an image side along the optical axis, as the focusing lens group, thereby focusing from an infinitely distant object to a close distance object.

In the variable magnification optical system according to the Fifth Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Fifth Example, in the wide angle end state, the vibration reduction coefficient is 1.61, and the focal length is 72.10 (mm), so that the moving amount of the B group G4B for correcting a rotational camera shake of 0.30 degrees is 0.23 (mm). In the telephoto end state, the vibration reduction coefficient is 2.44, and the focal length is 292.00 (mm), so that the moving amount of the B group G4B for correcting a rotational camera shake of 0.20 degrees is 0.42 (mm).

Table 5 below shows various values of the variable magnification optical system according to the Fifth Example.

TABLE 5

Fifth Example

[Surface Data]

| Surface number | r | d | nd | vd |
|---|---|---|---|---|
| Object Plane | ∞ | | | |
| 1 | 90.0000 | 5.600 | 1.51680 | 63.88 |
| 2 | −517.3850 | 0.200 | | |
| 3 | 123.0815 | 1.700 | 1.62004 | 36.40 |
| 4 | 39.0000 | 7.800 | 1.51680 | 63.88 |
| 5 | 324.1762 | variable | | |
| 6 | −110.0000 | 1.300 | 1.69680 | 55.52 |
| 7 | 21.2201 | 3.957 | 1.84666 | 23.80 |
| 8 | 73.0429 | 1.848 | | |
| 9 | −75.3714 | 1.200 | 1.85026 | 32.35 |
| 10 | 106.1768 | variable | | |
| 11 | 148.9696 | 3.374 | 1.58913 | 61.22 |
| 12 | −56.4978 | variable | | |
| 13 | 28.2564 | 5.746 | 1.49700 | 81.73 |
| 14 | −48.4258 | 1.200 | 1.84666 | 23.80 |
| 15 | −580.3411 | 2.897 | | |
| 16 (Stop S) | ∞ | 23.051 | | |
| 17 | −77.0000 | 3.951 | 1.72825 | 28.38 |
| 18 | −14.4874 | 1.000 | 1.67003 | 47.14 |
| 19 | 29.3362 | 2.500 | | |
| 20 | 29.8903 | 5.510 | 1.62004 | 36.40 |
| 21 | −17.4201 | 1.000 | 1.84666 | 23.80 |
| 22 | −35.2773 | 7.314 | | |
| 23 | −22.7541 | 1.000 | 1.77250 | 49.62 |
| 24 | −46.2730 | BF | | |
| Image Plane | ∞ | | | |

[Various Data]
variable magnification ratio 4.05

| | W | M | T |
|---|---|---|---|
| f | 72.1 | 100.0 | 292.0 |
| FNO | 4.70 | 4.63 | 6.53 |
| 2ω | 22.62 | 16.08 | 5.50 |
| Ymax | 14.25 | 14.25 | 14.25 |
| TL | 169.32 | 187.97 | 221.32 |
| BF | 39.61 | 38.52 | 66.61 |

Infinitely distant

| d5 | 3.001 | 26.619 | 53.461 |
|---|---|---|---|
| d10 | 33.373 | 28.524 | 2.000 |
| d12 | 11.187 | 12.162 | 17.100 |

Close distance

| d5 | 3.001 | 26.619 | 53.461 |
|---|---|---|---|
| d10 | 34.372 | 29.969 | 3.698 |
| d12 | 10.188 | 10.718 | 15.402 |

[Lens Group Data]

| Group | Starting Surface | f |
|---|---|---|
| 1 | 1 | 131.155 |
| 2 | 6 | −32.550 |
| 3 | 11 | 69.956 |
| 4 | 13 | 165.331 |

[Values for Conditional Expression]

| | |
|---|---|
| (1) | fA/(−fB) = 2.356 |
| (1A) | f1/(−fc) = 4.029 |
| (1B) | f1fw/ff = 4.519 |
| (2) | f1/ff = 1.902 |
| (3) | ff/fi = 0.417 |
| (4) | fi/(−fB) = 4.755 |
| (5) | vFP = 61.22 |
| (6) | ff/ft = 0.236 |

Figure 18A:
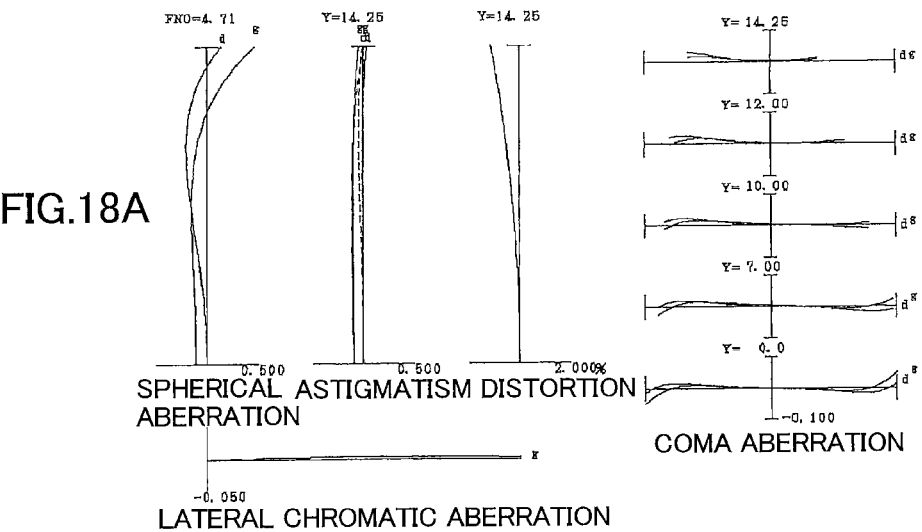
FIGS. 18A, 18B and 18C are graphs showing various aberrations of the variable magnification optical system according to the Fifth Example.
Figure 18B:
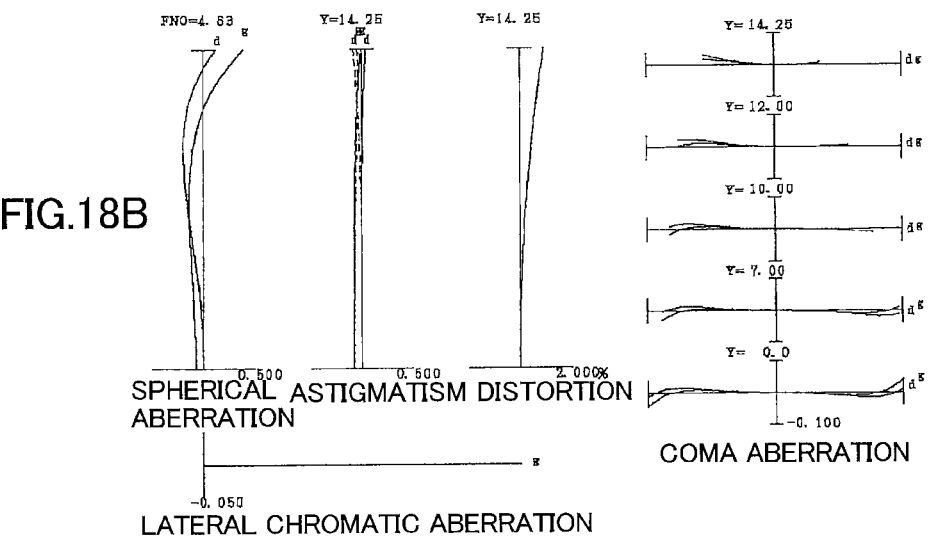
Figure 18C:
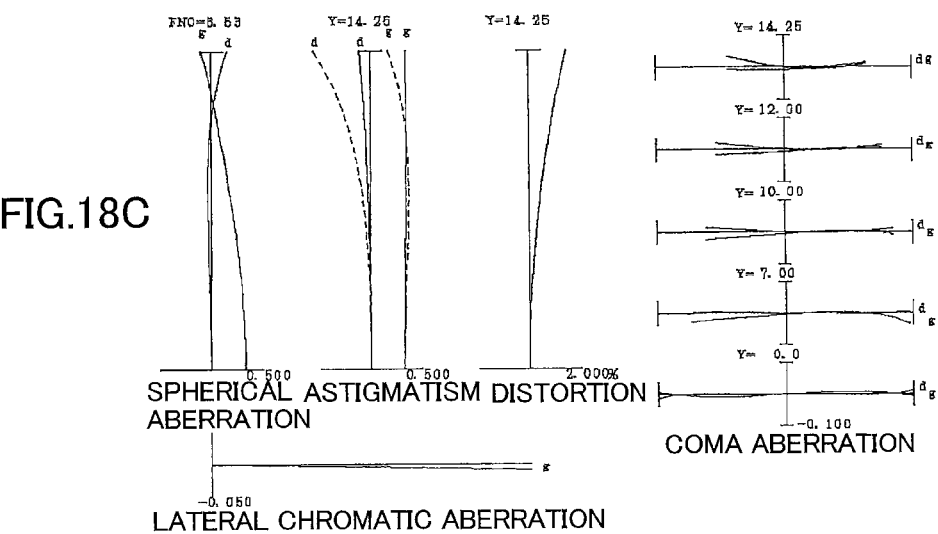

FIGS. 18A, 18B and 18C are graphs showing various aberrations of the variable magnification optical system according to the Fifth Example upon focusing on an infinitely distant object, in which FIG. 18A is in a wide angle end state, FIG. 18B is in an intermediate focal length state, and FIG. 18C is in a telephoto end state.

Figure 19A:
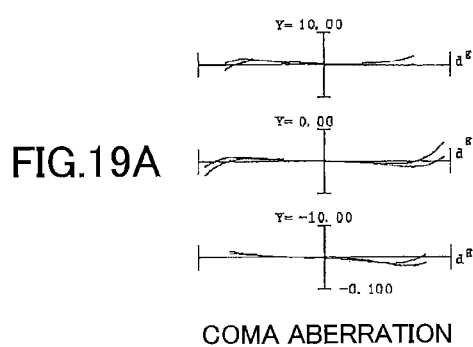
FIGS. 19A and 19B are graphs showing meridional transverse aberrations of the variable magnification optical system according to the Fifth Example.
Figure 19B:
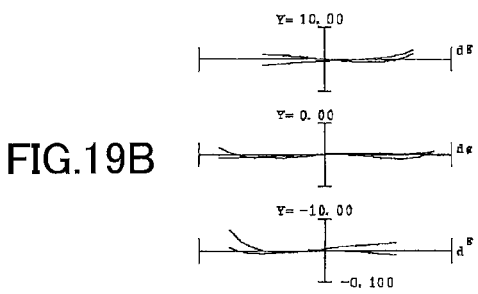

FIG. 19A is a graph showing meridional transverse aberration of the variable magnification optical system according to the Fifth Example upon focusing on an infinitely distant object in the wide angle end state with carrying out vibration reduction against a rotational camera shake of 0.30 degrees, and FIG. 19B is a graph showing meridional transverse aberration of the variable magnification optical system according to the Fifth Example upon focusing on an infinitely distant object in the telephoto end state with carrying out vibration reduction against a rotational camera shake of 0.20 degrees.

Figure 20A:
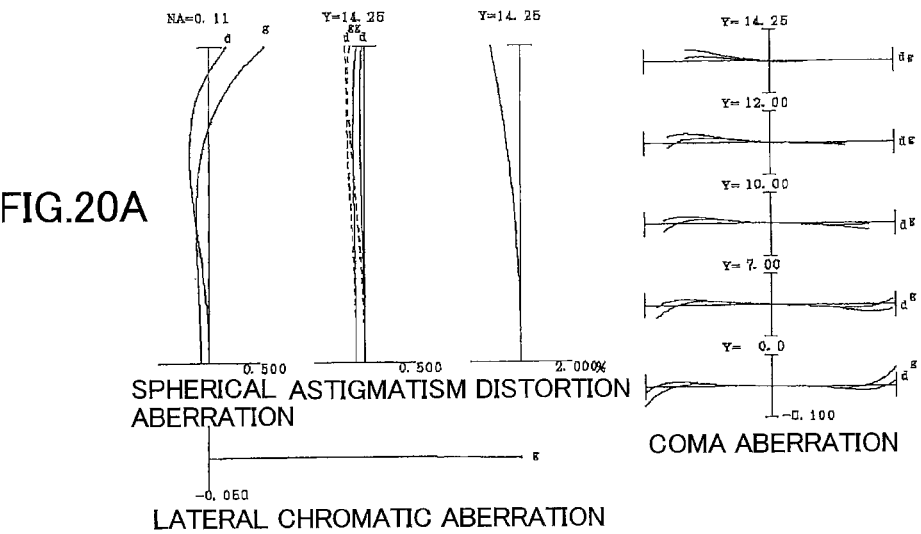
FIGS. 20A, 20B and 20C are graphs showing various aberrations of the variable magnification optical system according to the Fifth Example.
Figure 20B:
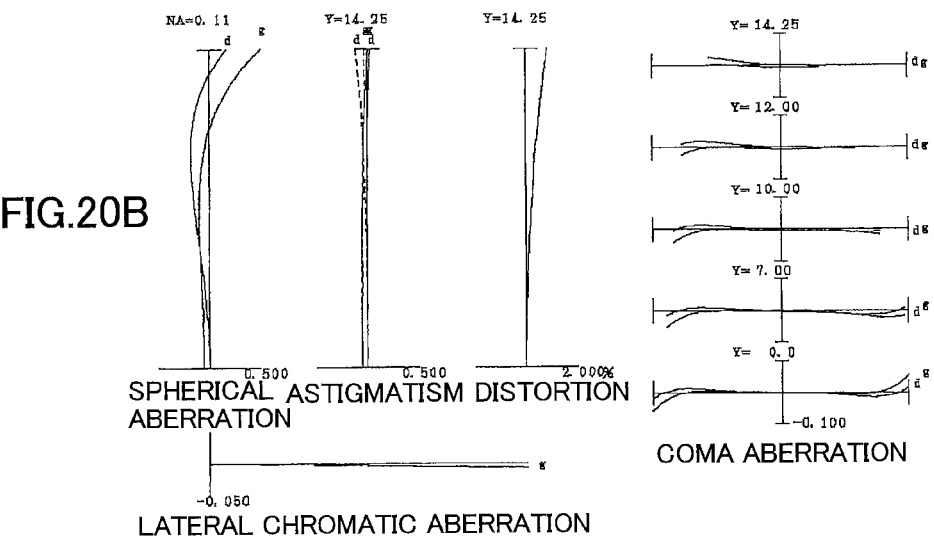
Figure 20C:
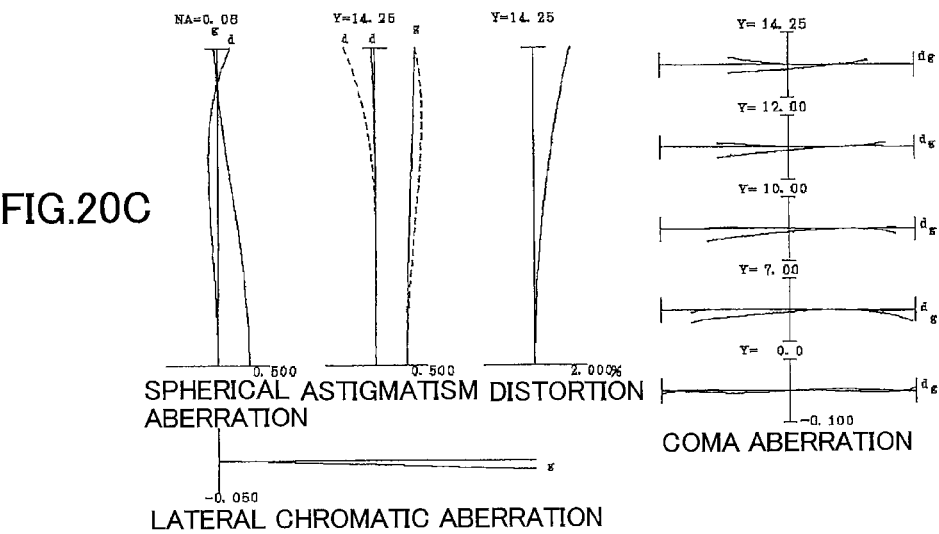

FIGS. 20A, 20B and 20C are graphs showing various aberrations of the variable magnification optical system according to the Fifth Example upon focusing on a close distance object, in which FIG. 20A is in the wide angle end state, FIG. 20B is in the intermediate focal length state, and FIG. 20C is in the telephoto end state.

As is apparent from the respective aberration graphs, the variable magnification optical system according to the Fifth Example shows superb imaging performance as a result of good corrections to various aberrations in the wide angle end state to the telephoto end state, and also shows superb imaging performance upon carrying out vibration reduction and upon focusing on a close distance object.

Sixth Example

FIG. 21 is a sectional view of a variable magnification optical system according to a Sixth Example.

The variable magnification optical system according to the Sixth Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a negative meniscus lens L44 having a concave surface facing the object side cemented with a double concave negative lens L45.

The C group G4C consists of, in order from the object side, a double convex positive lens L46, and a negative meniscus lens L47 having a concave surface facing the object side.

In the variable magnification optical system according to the Sixth Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Sixth Example, the third lens group G3 is moved toward an image side along the optical axis, as the focusing lens group, thereby focusing from an infinitely distant object to a close distance object.

In the variable magnification optical system according to the Sixth Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Sixth Example, in the wide angle end state, the vibration reduction coefficient is 1.54, and the focal length is 72.10 (mm), so that the moving amount of the B group G4B for correcting a rotational camera shake of 0.30 degrees is 0.25 (mm). In the telephoto end state, the vibration reduction coefficient is 2.42, and the focal length is 292.00 (mm), so that the moving amount of the B group G4B for correcting a rotational camera shake of 0.20 degrees is 0.42 (mm).

Table 6 below shows various values of the variable magnification optical system according to the Sixth Example.

TABLE 6

Sixth Example

[Surface Data]

| Surface number | r | d | nd | vd |
| --- | --- | --- | --- | --- |
| Object Plane | ∞ | | | |
| 1 | 94.0000 | 5.600 | 1.51680 | 63.88 |
| 2 | −475.5757 | 0.200 | | |
| 3 | 128.0000 | 1.700 | 1.62004 | 36.40 |
| 4 | 39.6000 | 8.000 | 1.51680 | 63.88 |
| 5 | 425.5305 | variable | | |
| 6 | −190.0000 | 1.300 | 1.69680 | 55.52 |
| 7 | 20.4656 | 4.300 | 1.84666 | 23.80 |
| 8 | 66.5049 | 2.063 | | |
| 9 | −61.8359 | 1.200 | 1.85026 | 32.35 |
| 10 | 109.1965 | variable | | |
| 11 | 128.7113 | 3.300 | 1.58913 | 61.22 |
| 12 | −63.7222 | variable | | |
| 13 | 37.0000 | 5.400 | 1.49700 | 81.73 |
| 14 | −45.9212 | 1.300 | 1.85026 | 32.35 |
| 15 | 148.3744 | 0.200 | | |
| 16 | 45.1050 | 3.600 | 1.48749 | 70.31 |
| 17 | −172.8812 | 4.000 | | |
| 18 (Stop S) | ∞ | 26.764 | | |
| 19 | −95.3704 | 3.900 | 1.74950 | 35.25 |
| 20 | −14.2257 | 1.000 | 1.69680 | 55.52 |
| 21 | 24.1570 | 2.279 | | |
| 22 | 26.2427 | 4.000 | 1.62004 | 36.40 |
| 23 | −55.0000 | 2.250 | | |
| 24 | −20.2886 | 1.000 | 1.84666 | 23.80 |

TABLE 6-continued

Sixth Example

| 25 | −34.0000 | BF |
|---|---|---|
| Image Plane | ∞ | |

[Various Data]
Variable magnification ratio 4.05

| | W | M | T |
|---|---|---|---|
| f | 72.1 | 100.0 | 292.0 |
| FNO | 4.69 | 4.66 | 6.54 |
| 2ω | 22.56 | 16.04 | 5.50 |
| Ymax | 14.25 | 14.25 | 14.25 |
| TL | 169.32 | 189.24 | 221.32 |
| BF | 38.93 | 38.52 | 65.93 |

Infinitely distant

| d5 | 2.500 | 25.118 | 52.806 |
|---|---|---|---|
| d10 | 33.481 | 28.557 | 2.155 |
| d12 | 11.047 | 13.692 | 17.068 |

Close distance

| d5 | 2.500 | 25.118 | 52.806 |
|---|---|---|---|
| d10 | 34.454 | 29.917 | 3.849 |
| d12 | 10.075 | 12.332 | 15.373 |

[Lens Group Data]

| Group | Starting Surface | f |
|---|---|---|
| 1 | 1 | 130.472 |
| 2 | 6 | −32.352 |
| 3 | 11 | 72.809 |
| 4 | 13 | 142.608 |

[Values for Conditional Expression]

| (1) | fA/(−fB) = 2.479 |
|---|---|
| (1A) | f1/(−fc) = 4.033 |
| (1B) | f1fw/ff = 6.295 |
| (2) | f1/ff = 1.792 |
| (3) | ff/fi = 0.511 |
| (4) | fi/(−fB) = 4.779 |
| (5) | vFP = 61.22 |
| (6) | ff/ft = 0.249 |

Figure 22A:
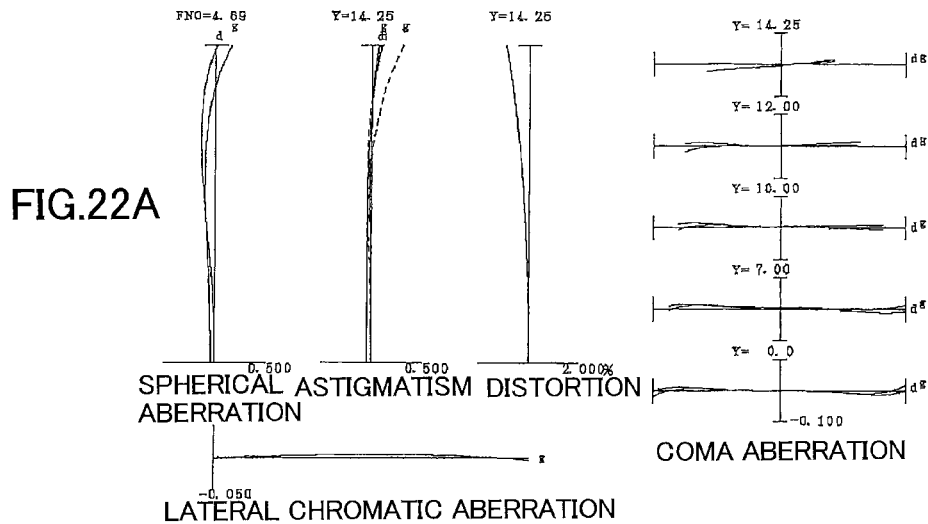
FIGS. 22A, 22B and 22C are graphs showing various aberrations of the variable magnification optical system according to the Sixth Example.
Figure 22B:
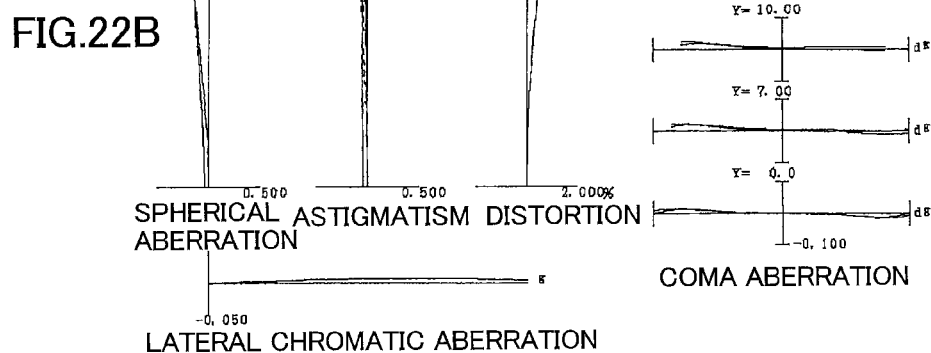
Figure 22C:
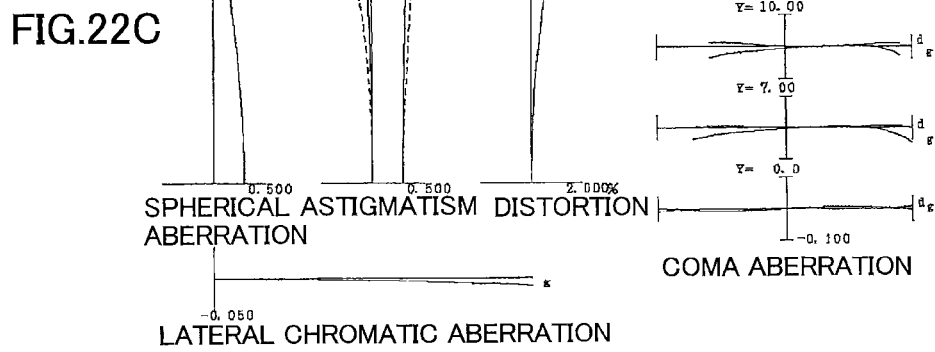

FIGS. 22A, 22B and 22C are graphs showing various aberrations of the variable magnification optical system according to the Sixth Example upon focusing on an infinitely distant object, in which FIG. 22A is in a wide angle end state, FIG. 22B is in an intermediate focal length state, and FIG. 22C is in a telephoto end state.

Figure 23A:
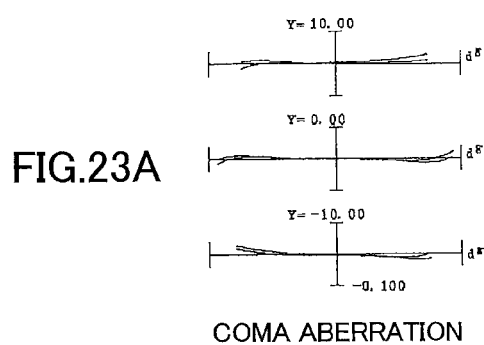
FIGS. 23A and 23B are graphs showing meridional transverse aberrations of the variable magnification optical system according to the Sixth Example.
Figure 23B:

FIG. 23A is a graph showing meridional transverse aberration of the variable magnification optical system according to the Sixth Example upon focusing on an infinitely distant object in the wide angle end state with carrying out vibration reduction against a rotational camera shake of 0.30 degrees, and FIG. 23B is a graph showing meridional transverse aberration of the variable magnification optical system according to the Sixth Example upon focusing on an infinitely distant object in the telephoto end state with carrying out vibration reduction against a rotational camera shake of 0.20 degrees.

Figure 24A:
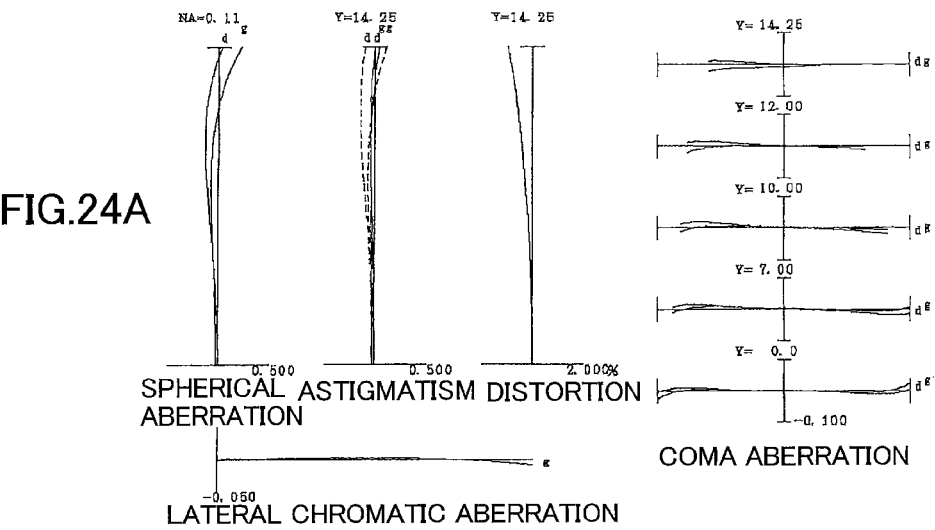
FIGS. 24A, 24B and 24C are graphs showing various aberrations of the variable magnification optical system according to the Sixth Example.
Figure 24B:
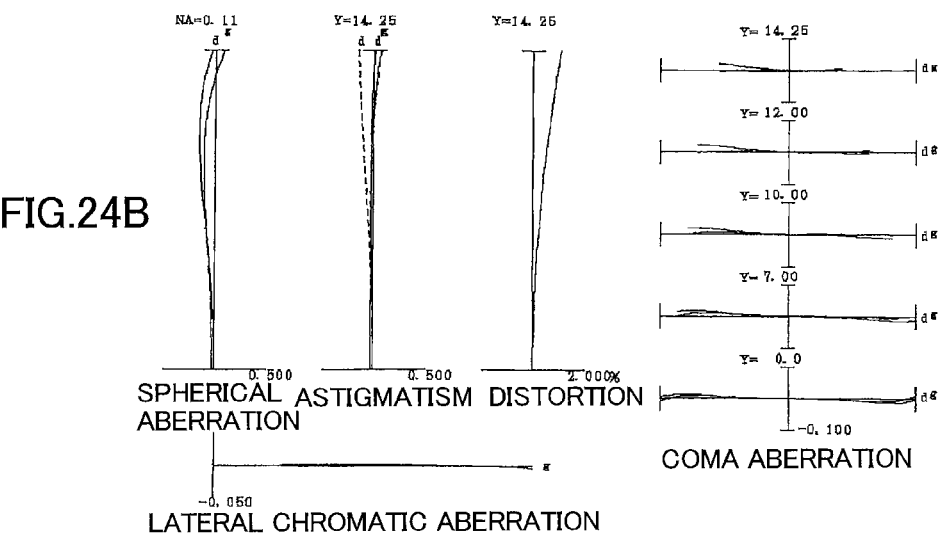
Figure 24C:
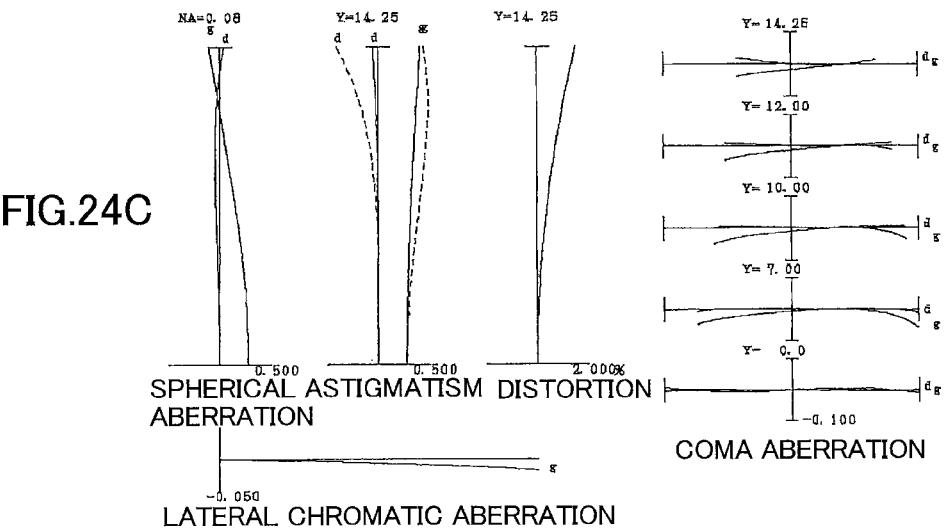

FIGS. 24A, 24B and 24C are graphs showing various aberrations of the variable magnification optical system according to the Sixth Example upon focusing on a close distance object, in which FIG. 24A is in the wide angle end state, FIG. 24B is in the intermediate focal length state, and FIG. 24C is in the telephoto end state.

As is apparent from the respective aberration graphs, the variable magnification optical system according to the Sixth Example shows superb imaging performance as a result of good corrections to various aberrations in the wide angle end state to the telephoto end state, and also shows superb imaging performance upon carrying out vibration reduction and upon focusing on a close distance object.

Seventh Example

Figure 25:
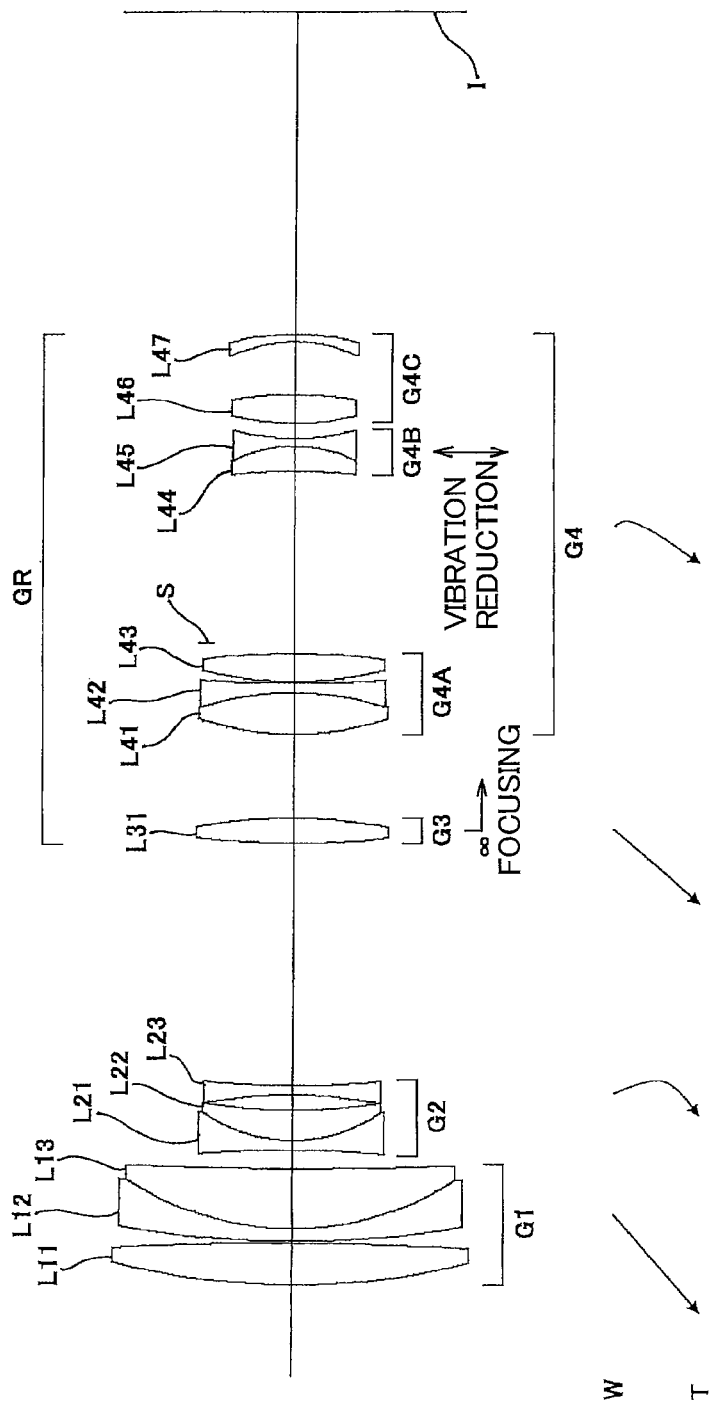
FIG. 25 is a sectional view of a variable magnification optical system according to a Seventh Example.

FIG. 25 is a sectional view of a variable magnification optical system according to a Seventh Example.

The variable magnification optical system according to the Seventh Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, and a fourth lens group G4 having positive refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a positive meniscus lens L44 having a concave surface facing the object side cemented with a double concave negative lens L45.

The C group G4C consists of, in order from the object side, a double convex positive lens L46, and a negative meniscus lens L47 having a concave surface facing the object side.

In the variable magnification optical system according to the Seventh Example, the first to fourth lens groups G1 to G4 are moved along the optical axis so that, upon varying magnification between the wide angle end state and the telephoto end state, a distance between the first lens group G1 and the second lens group G2, a distance between the second lens group G2 and the third lens group G3 and a distance between the third lens group G3 and the fourth lens group G4 are varied.

In the variable magnification optical system according to the Seventh Example, the third lens group G3 is moved toward an image side along the optical axis, as the focusing lens group, thereby focusing from an infinitely distant object to a close distance object.

In the variable magnification optical system according to the Seventh Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Seventh Example, in the wide angle end state, the vibration reduction coefficient is 1.61, and the focal length is 72.10 (mm), so that the moving amount of the B group G4B for correcting a rotational camera shake of 0.30 degrees is 0.23 (mm). In the telephoto end state, the vibration reduction coefficient is 2.42, and the focal length is 292.00 (mm), so that the moving amount of the B group G4B for correcting a rotational camera shake of 0.20 degrees is 0.42 (mm).

Table 7 below shows various values of the variable magnification optical system according to the Seventh Example.

TABLE 7

Seventh Example

[Surface Data]

| Surface number | r | d | nd | vd |
|---|---|---|---|---|
| Object Plane | ∞ | | | |
| 1 | 94.0000 | 5.600 | 1.51680 | 63.88 |
| 2 | −477.1369 | 0.200 | | |
| 3 | 127.9954 | 1.700 | 1.62004 | 36.40 |
| 4 | 39.7182 | 8.000 | 1.51680 | 63.88 |
| 5 | 477.0326 | variable | | |
| 6 | −133.8008 | 1.300 | 1.69680 | 55.52 |
| 7 | 20.5210 | 4.000 | 1.84666 | 23.80 |
| 8 | 68.1000 | 2.028 | | |
| 9 | −63.5000 | 1.200 | 1.85026 | 32.35 |
| 10 | 113.2367 | variable | | |
| 11 | 102.3130 | 3.400 | 1.58913 | 61.22 |
| 12 | −69.1650 | | | |
| 13 | 39.2000 | 5.500 | 1.49700 | 81.73 |
| 14 | −39.2000 | 1.300 | 1.85026 | 32.35 |
| 15 | 209.5771 | 0.200 | | |
| 16 | 50.7811 | 3.700 | 1.48749 | 70.31 |
| 17 | −101.5494 | 1.393 | | |
| 18 (Stop S) | ∞ | 22.905 | | |
| 19 | −80.0000 | 3.300 | 1.80100 | 34.92 |
| 20 | −18.0344 | 1.000 | 1.70000 | 48.11 |
| 21 | 29.8801 | 2.000 | | |
| 22 | 34.2607 | 3.800 | 1.60342 | 38.03 |
| 23 | −54.3498 | 7.014 | | |
| 24 | −20.2978 | 1.000 | 1.77250 | 49.62 |
| 25 | −34.3298 | BF | | |
| Image plane | ∞ | | | |

[Various Data]
Variable magnification ratio 4.05

| | W | M | T |
|---|---|---|---|
| f | 72.1 | 100.0 | 292.0 |
| FNO | 4.71 | 4.68 | 6.51 |
| 2ω | 22.58 | 16.04 | 5.50 |
| Ymax | 14.25 | 14.25 | 14.25 |
| TL | 169.32 | 188.35 | 221.32 |
| BF | 42.82 | 42.30 | 69.82 |
| Infinitely distant | | | |
| d5 | 2.500 | 25.131 | 52.658 |
| d10 | 32.209 | 27.505 | 2.151 |
| d12 | 11.251 | 12.875 | 16.152 |
| Close distance | | | |
| d5 | 2.500 | 25.131 | 52.658 |
| d10 | 33.116 | 28.781 | 3.756 |
| d12 | 10.345 | 11.599 | 14.546 |

TABLE 7-continued

Seventh Example

[Lens Group Data]

| Group | Starting Surface | f |
|---|---|---|
| 1 | 1 | 128.381 |
| 2 | 6 | −31.506 |
| 3 | 11 | 70.567 |
| 4 | 13 | 143.423 |

[Values for Conditional Expression]

(1) fA/(−fB) = 2.044
(1A) f1/(−fc) = 4.075
(1B) f1fw/ff = 6.330
(2) f1/ff = 1.819
(3) ff/fi = 0.492
(4) fi/(−fB) = 4.048
(5) vFP = 61.22
(6) ff/ft = 0.242

Figure 26A:
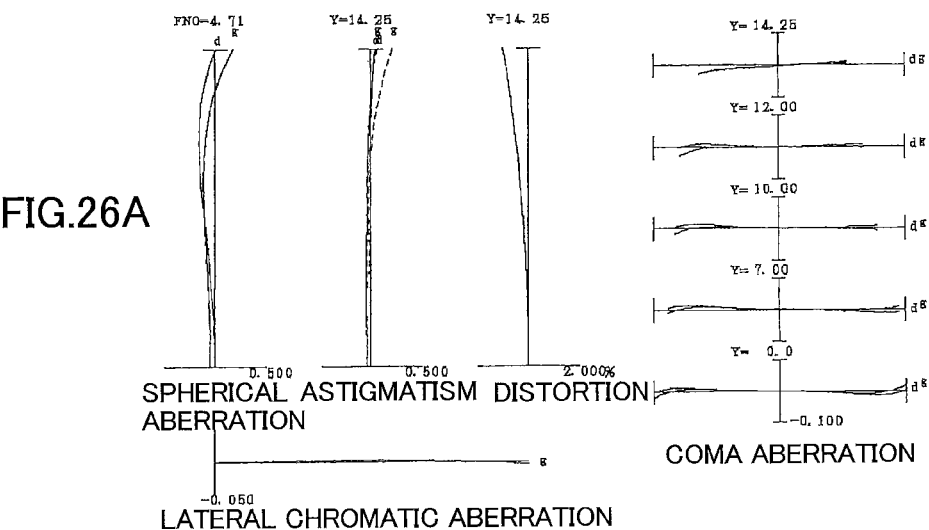
FIGS. 26A, 26B and 26C are graphs showing various aberrations of the variable magnification optical system according to the Seventh Example.
Figure 26B:
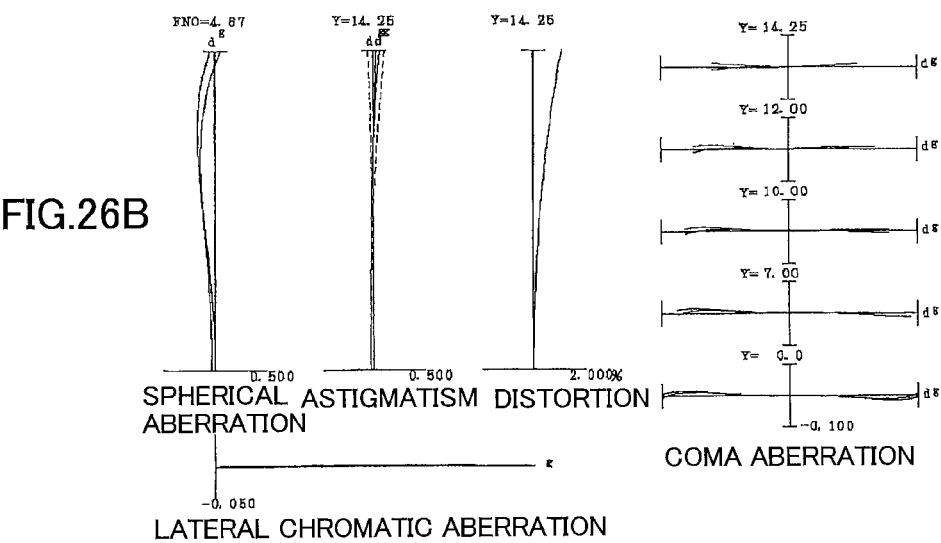
Figure 26C:
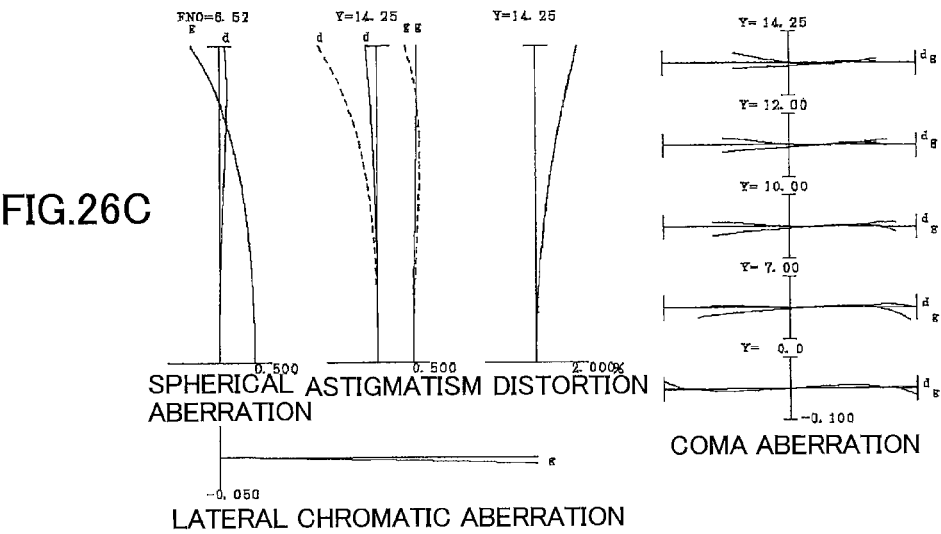

FIGS. 26A, 26B and 26C are graphs showing various aberrations of the variable magnification optical system according to the Seventh Example upon focusing on an infinitely distant object, in which FIG. 26A is in a wide angle end state, FIG. 26B is in an intermediate focal length state, and FIG. 26C is in a telephoto end state.

Figure 27A:
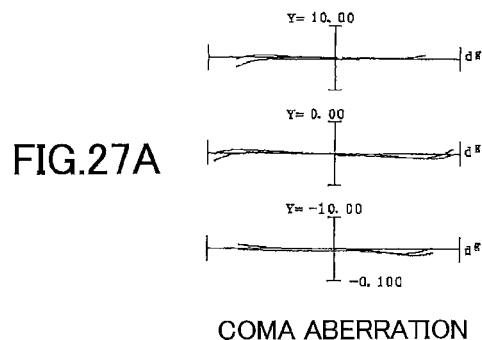
FIGS. 27A and 27B are graphs showing meridional transverse aberrations of the variable magnification optical system according to the Seventh Example.
Figure 27B:
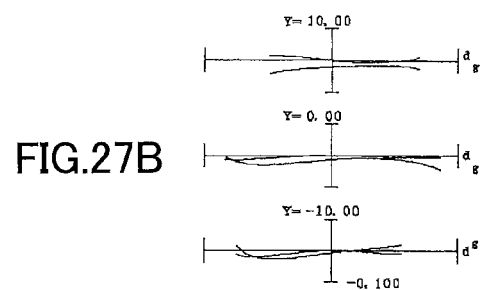

FIG. 27A is a graph showing meridional transverse aberration of the variable magnification optical system according to the Seventh Example upon focusing on an infinitely distant object in the wide angle end state with carrying out vibration reduction against a rotational camera shake of 0.30 degrees, and FIG. 27B is a graph showing meridional transverse aberration of the variable magnification optical system according to the Seventh Example upon focusing on an infinitely distant object in the telephoto end state with carrying out vibration reduction against a rotational camera shake of 0.20 degrees.

Figure 28A:
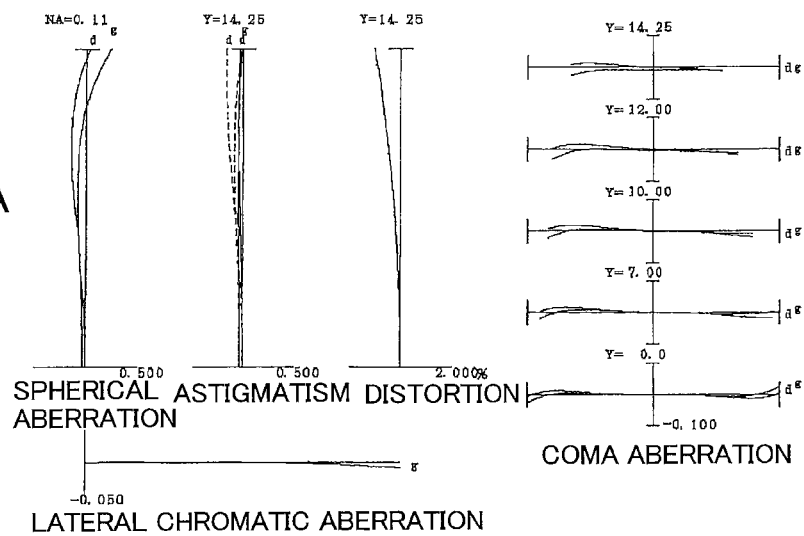
FIGS. 28A, 28B and 28C are graphs showing various aberrations of the variable magnification optical system according to the Seventh Example.
Figure 28B:
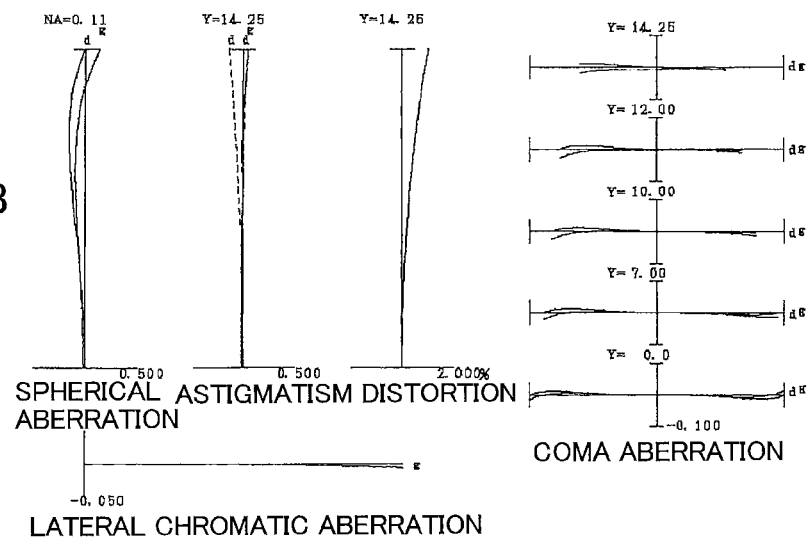
Figure 28C:
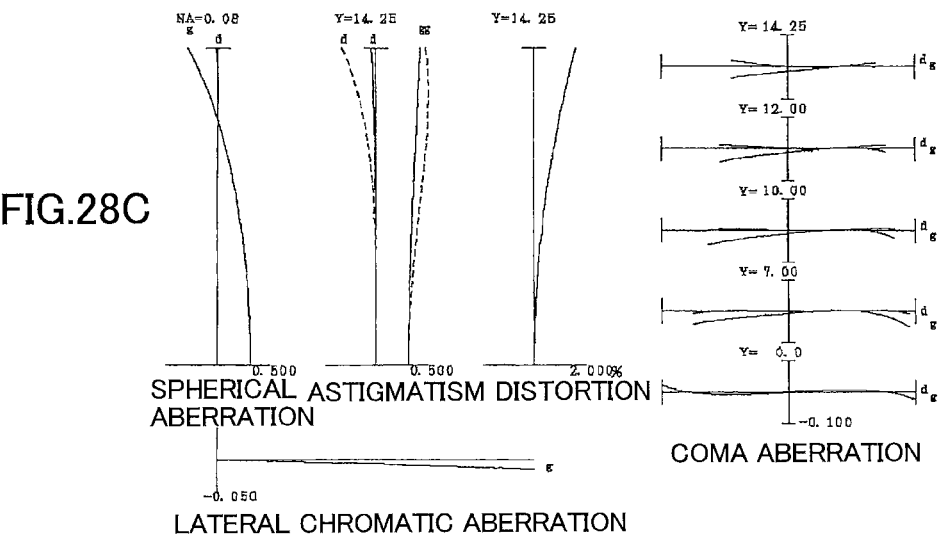

FIGS. 28A, 28B and 28C are graphs showing various aberrations of the variable magnification optical system according to the Seventh Example upon focusing on a close distance object, in which FIG. 28A is in the wide angle end state, FIG. 28B is in the intermediate focal length state, and FIG. 28C is in the telephoto end state.

As is apparent from the respective aberration graphs, the variable magnification optical system according to the Seventh Example shows superb imaging performance as a result of good corrections to various aberrations in the wide angle end state to the telephoto end state, and also shows superb imaging performance upon carrying out vibration reduction and upon focusing on a close distance object.

Eighth Example

Figure 29:
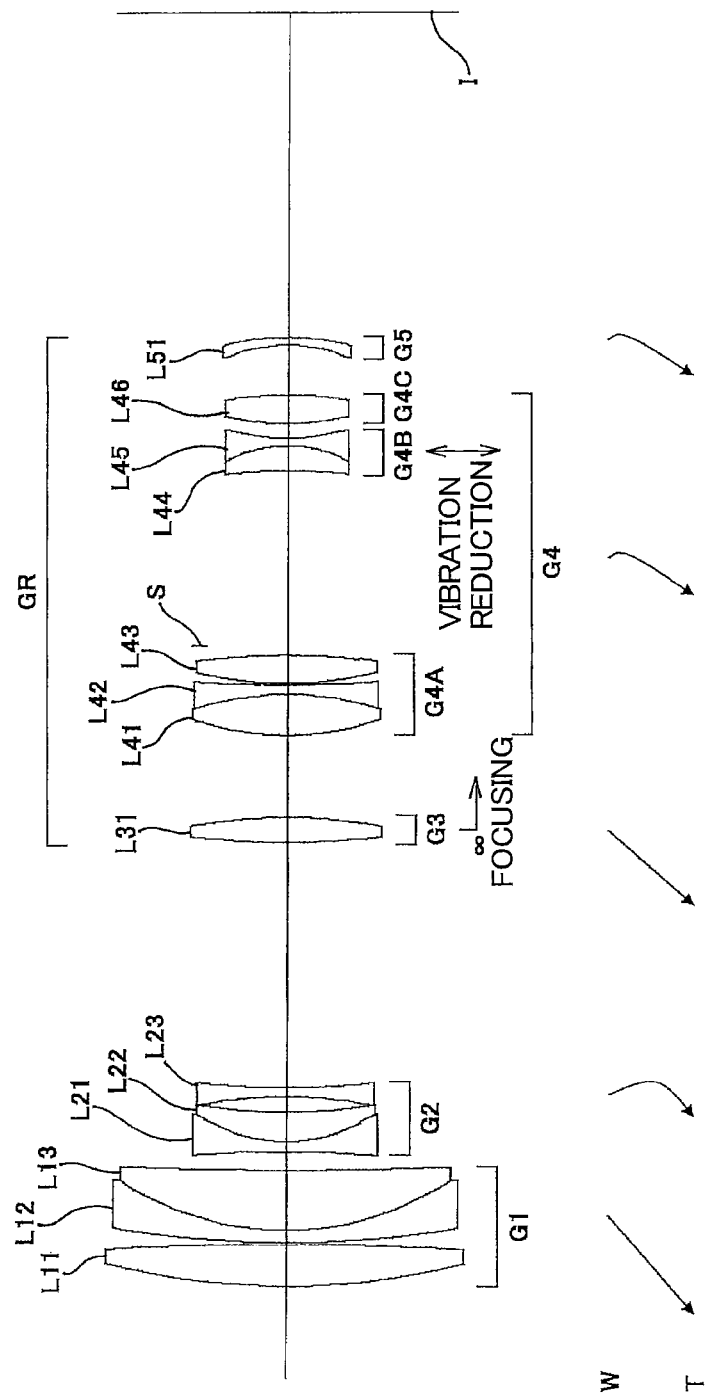
FIG. 29 is a sectional view of a variable magnification optical system according to an Eighth Example.

FIG. 29 is a sectional view of a variable magnification optical system according to an Eighth Example.

The variable magnification optical system according to the Eighth Example is composed of, in order from an object side, a first lens group G1 having positive refractive power, a second lens group G2 having negative refractive power, and a rear group GR having positive refractive power. The rear group GR is composed of, in order from the object side, a third lens group G3 having positive refractive power, a fourth lens group G4 having positive refractive power, and a fifth lens group G5 having negative refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a positive meniscus lens L44 having a concave surface facing the object side cemented with a double concave negative lens L45.

The C group G4C consists of a double convex positive lens L46.

The fifth lens group G5 consists of a negative meniscus lens L51 having a concave surface facing the object side.

In the variable magnification optical system according to the Eighth Example, the first to the fifth lens groups G1 to G5 are moved along the optical axis so that, upon varying magnification between the wide angle end state and the telephoto end state, a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5 are varied.

In the variable magnification optical system according to the Eighth Example, the third lens group G3 is moved toward an image side along the optical axis, as the focusing lens group, thereby focusing from an infinitely distant object to a close distance object.

In the variable magnification optical system according to the Eighth Example, the B group G4B is moved, as a vibration reduction group, to have a component in a direction perpendicular to the optical axis, thereby conducting vibration reduction. Meanwhile, upon carrying out vibration reduction, positions of the A group G4A and the C group G4C in a direction perpendicular to the optical axis are fixed.

It is noted that in the variable magnification optical system according to the Eighth Example, in the wide angle end state, the vibration reduction coefficient is 1.62, and the focal length is 72.10 (mm), so that the moving amount of the B group G4B for correcting a rotational camera shake of 0.30 degrees is 0.23 (mm). In the telephoto end state, the vibration reduction coefficient is 2.42, and the focal length is 292.00 (mm), so that the moving amount of the B group G4B for correcting a rotational camera shake of 0.20 degrees is 0.42 (mm).

Table 8 below shows various values of the variable magnification optical system according to the Eighth Example.

TABLE 8

Eighth Example

[Surface Data]

| Surface number | r | d | nd | vd |
|---|---|---|---|---|
| Object Plane | ∞ | | | |
| 1 | 94.0000 | 5.600 | 1.51680 | 63.88 |
| 2 | −475.1178 | 0.200 | | |
| 3 | 128.0000 | 1.700 | 1.62004 | 36.40 |
| 4 | 39.6000 | 8.000 | 1.51680 | 63.88 |
| 5 | 485.7465 | variable | | |
| 6 | −132.5210 | 1.300 | 1.69680 | 55.52 |
| 7 | 20.5172 | 4.000 | 1.84666 | 23.80 |
| 8 | 68.1000 | 2.042 | | |
| 9 | −63.5000 | 1.200 | 1.85026 | 32.35 |
| 10 | 115.6235 | variable | | |
| 11 | 101.8918 | 3.400 | 1.58913 | 61.22 |
| 12 | −69.9544 | variable | | |
| 13 | 39.2000 | 5.500 | 1.49700 | 81.73 |
| 14 | −39.2000 | 1.300 | 1.85026 | 32.35 |
| 15 | 212.6596 | 0.200 | | |
| 16 | 51.4164 | 3.700 | 1.48749 | 70.31 |
| 17 | −99.0728 | 1.373 | | |
| 18 (Stop S) | ∞ | 23.152 | | |
| 19 | −80.0000 | 3.300 | 1.80100 | 34.92 |
| 20 | −17.8244 | 1.000 | 1.70000 | 48.11 |
| 21 | 29.4302 | 2.000 | | |
| 22 | 34.1234 | 3.800 | 1.60342 | 38.03 |
| 23 | −54.6969 | variable | | |
| 24 | −20.3466 | 1.000 | 1.77250 | 49.62 |
| 25 | −34.1069 | BF | | |
| Image Plane | ∞ | | | |

[Various Data]
Variable magnification ratio 4.05

| | W | M | T |
|---|---|---|---|
| f | 72.1 | 100.0 | 292.0 |
| FNO | 4.71 | 4.69 | 6.49 |
| 2ω | 22.58 | 16.06 | 5.50 |
| Ymax | 14.25 | 14.25 | 14.25 |
| TL | 169.32 | 188.16 | 221.32 |
| BF | 43.07 | 42.89 | 70.02 |
| Infinitely distant | | | |
| d5 | 2.500 | 24.944 | 52.518 |
| d10 | 32.517 | 27.845 | 2.150 |
| d12 | 10.875 | 12.288 | 16.347 |
| d23 | 6.586 | 6.430 | 6.515 |
| Close distance | | | |
| d5 | 2.500 | 24.944 | 52.518 |
| d10 | 33.434 | 29.131 | 3.779 |
| d12 | 9.958 | 11.001 | 14.718 |
| d23 | 6.586 | 6.430 | 6.515 |

[Lens Group Data]

| Group | Starting Surface | f |
|---|---|---|
| 1 | 1 | 128.138 |
| 2 | 6 | −31.607 |
| 3 | 11 | 70.925 |
| 4 | 13 | 71.734 |
| 5 | 24 | −67.420 |

[Values for Conditional Expression]

| (1) | fA/(−fB) = 2.058 |
|---|---|
| (1A) | f1/(−fc) = 4.054 |
| (1B) | f1·fw/ff = 6.215 |
| (2) | f1/ff = 1.807 |
| (3) | ff/fi = 0.989 |
| (4) | fi/(−fB) = 2.046 |
| (5) | vFP = 61.22 |
| (6) | ff/ft = 0.243 |

Figure 30A:
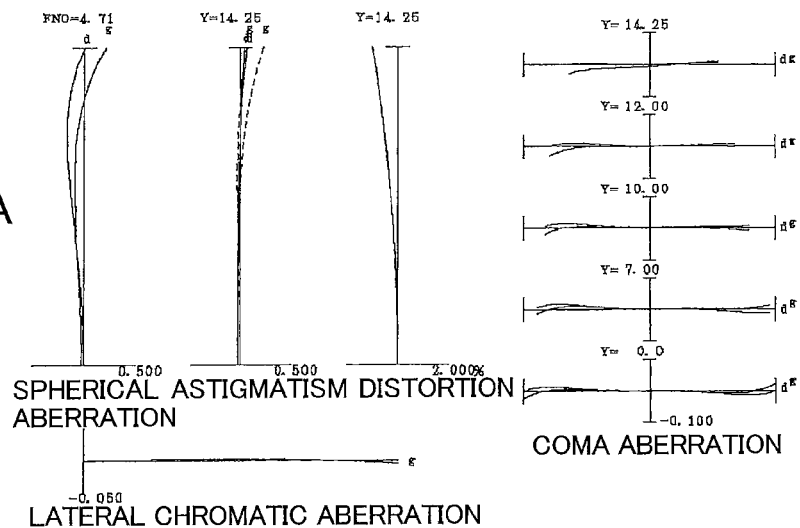
FIGS. 30A, 30B and 30C are graphs showing various aberrations of the variable magnification optical system according to the Eighth Example.
Figure 30B:
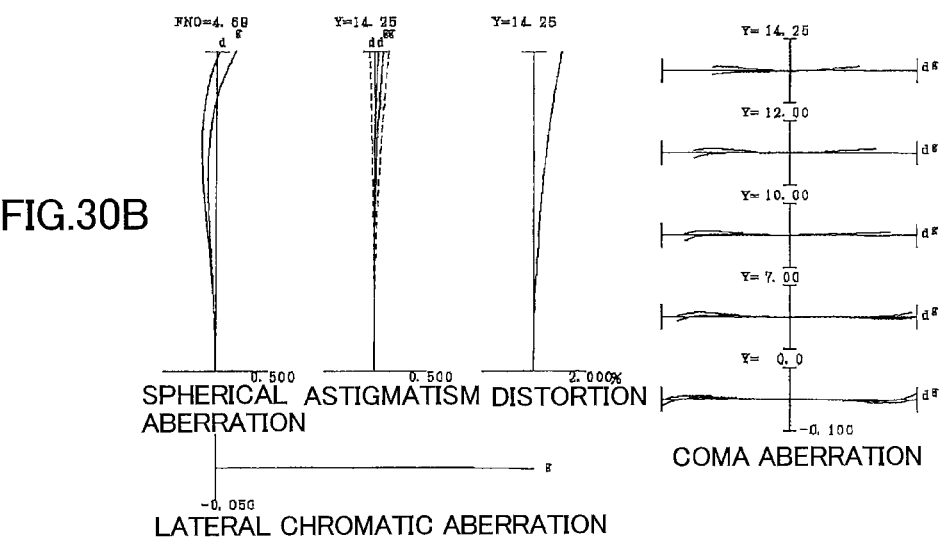
Figure 30C:
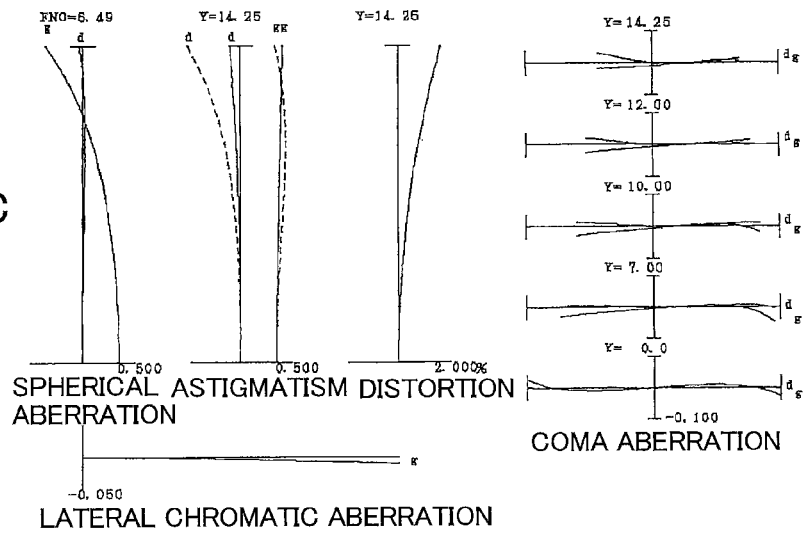

FIGS. 30A, 30B and 30C are graphs showing various aberrations of the variable magnification optical system according to the Eighth Example upon focusing on an infinitely distant object, in which FIG. 30A is in a wide angle end state, FIG. 30B is in an intermediate focal length state, and FIG. 30C is in a telephoto end state.

Figure 31A:
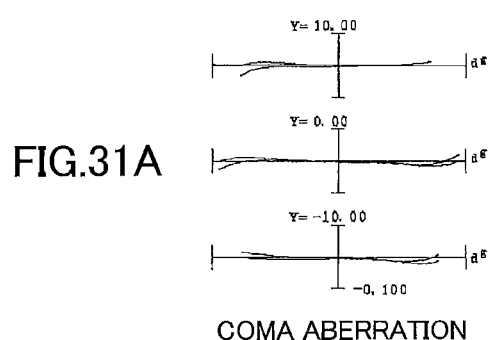
FIGS. 31A and 31B are graphs showing meridional transverse aberrations of the variable magnification optical system according to the Eighth Example.
Figure 31B:
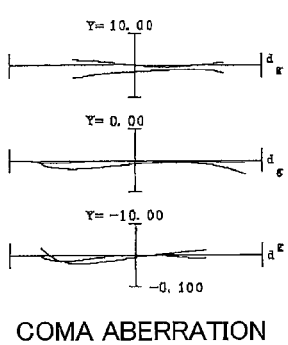

FIG. 31A is a graph showing meridional transverse aberration of the variable magnification optical system according to the Eighth Example upon focusing on an infinitely distant object in the wide angle end state with carrying out vibration reduction against a rotational camera shake of 0.30 degrees, and FIG. 31B is a graph showing meridional transverse aberration of the variable magnification optical system according to the Eighth Example upon focusing on an infinitely distant object in the telephoto end state with carrying out vibration reduction against a rotational camera shake of 0.20 degrees.

Figure 32A:
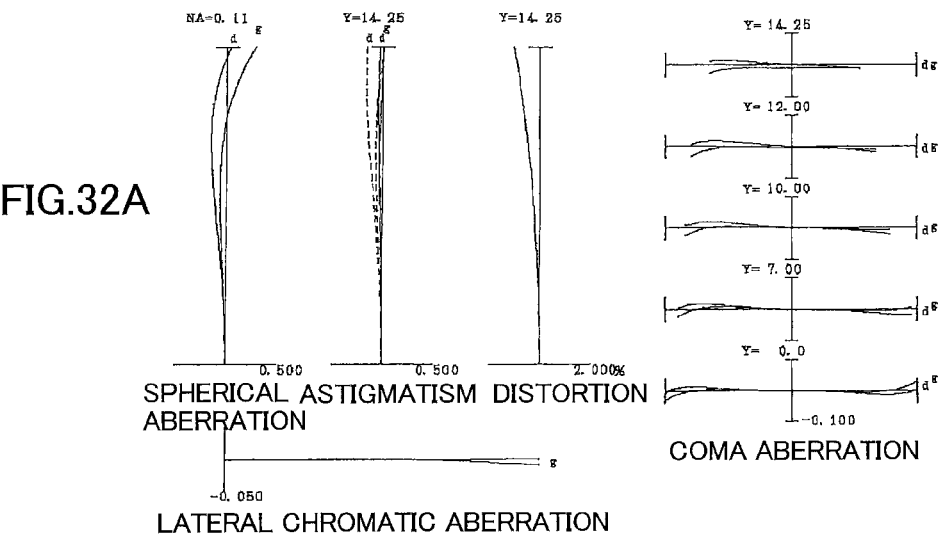
FIGS. 32A, 32B and 32C are graphs showing various aberrations of the variable magnification optical system according to the Eighth Example.
Figure 32B:
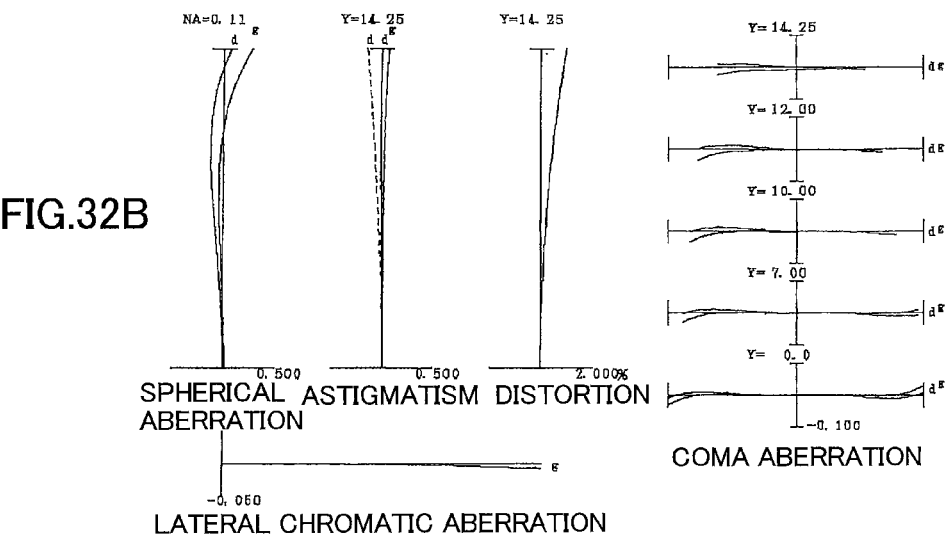
Figure 32C:
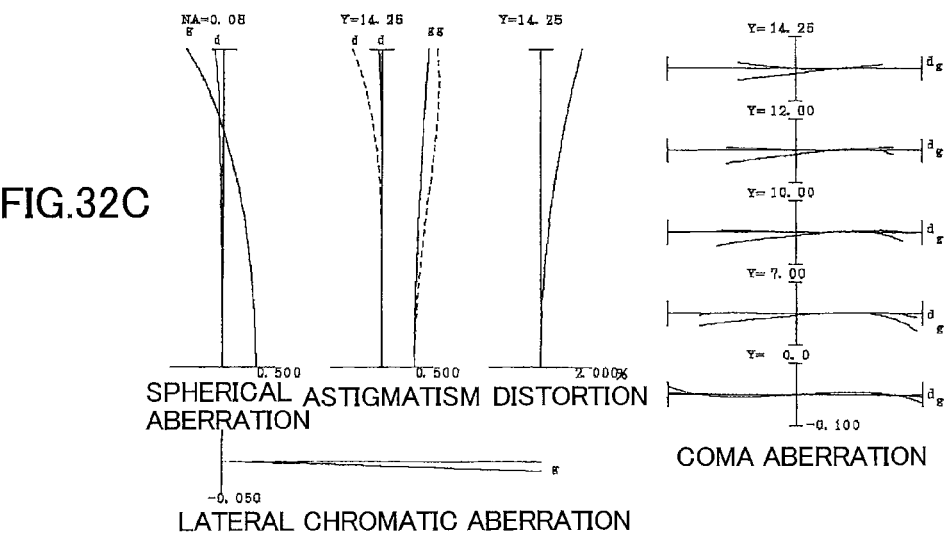

FIGS. 32A, 32B and 32C are graphs showing various aberrations of the variable magnification optical system according to the Eighth Example upon focusing on a close distance object, in which FIG. 32A is in the wide angle end state, FIG. 32B is in the intermediate focal length state, and FIG. 32C is in the telephoto end state.

As is apparent from the respective aberration graphs, the variable magnification optical system according to the Eighth Example shows superb imaging performance as a result of good corrections to various aberrations in the wide angle end state to the telephoto end state, and also shows superb imaging performance upon carrying out vibration reduction and upon focusing on a close distance object.

According to the above-mentioned examples, it is possible to realize a variable magnification optical system which can superbly suppress variations in various aberrations upon varying magnification from the wide angle end state to the telephoto end state and variations in various aberrations upon focusing from an infinitely distant object to a close distance object and can downsize a focusing group and make it light in weight. That is, in this variable magnification optical system, by downsizing the focusing group and making it light in weight, the focusing group can be driven by a small-sized motor or mechanical mechanism, thereby realizing a high speed and silent focusing operation with avoiding enlargement of a lens barrel.

Note that each of the above described Examples is a concrete example of the invention of the present application, and the invention of the present application is not limited to them. The contents described below can be properly adopted without deteriorating optical performance of the variable magnification optical systems according to the embodiment of the present application.

Although the variable magnification optical systems each having a four or five group configuration are illustrated above as examples of the variable magnification optical systems according to the embodiment of the present application, the present application is not limited to them and the variable magnification optical systems having other configurations, such as a six group configuration and the like, can be configured. Concretely, a configuration that a lens or a lens group is added to a most object side or a most image side of the variable magnification optical system according to each of the above-mentioned examples is also possible.

Further, in each of the above-mentioned examples, the second lens group is illustrated as an intermediate group disposed at an image side of the first lens group and having negative refractive power, but the present invention is not limited to such configuration. Further, in each of the above-mentioned examples, the third lens group is illustrated as a focusing group disposed at an image side of the second lens group as an intermediate group and having positive refractive power, but the present invention is not limited to such configuration. Further, in each of the above-mentioned examples, the fourth lens group is illustrated as an image side group disposed at an image side of the focusing group and having positive refractive power, but the present invention is not limited to such configuration. Concretely, it is also possible that a lens group having a positive or negative refractive power is disposed between the first lens group and the intermediate group (the second lens group) and distances between these lens groups are varied upon varying magnification. Further, it is also possible that a lens group having a positive or negative refractive power is disposed between the intermediate group (the second lens group) and the focusing group (the third lens group) and distances between these lens groups are varied upon varying magnification. Further, it is also possible that a lens group having a positive or negative refractive power is disposed between the focusing group (the third lens group) and the image side group (the fourth lens group) and distances between these lens groups are varied upon varying magnification.

In the variable magnification optical system according to each of the above-mentioned examples, it is preferable that the vibration reduction group is disposed at an image side of the focusing group, and it is more preferable that other lens(es) is(are) disposed between the focusing group and the vibration reduction group. Further, regarding the rear group, in a case where other lens(es) is(are) disposed between the focusing group and the vibration reduction group, it is preferable that an air distance between a lens facing an object side of the vibration reduction group and the vibration reduction group is the largest one of the air distances in the rear group.

Further, regarding the rear group, it is preferable that an aperture stop is disposed between the focusing group and the vibration reduction group, and it is more preferable that an aperture stop is disposed at a position facing an object side of the vibration reduction group. Meanwhile, the function of an aperture stop may be substituted by a lens frame without disposing a member as the aperture stop.

Further, the refractive power of the C group is positive in each of the Examples, but it may be negative.

Further, a sub-combination of feature groups of respective examples also is deemed as an invention of the present application.

Further, in the variable magnification optical system according to each of the above-mentioned examples, the whole third lens group is used as a focusing group, but a part of lens group or two or more lens groups may be used as a focusing group. Further, it is preferable that the focusing group has a positive refractive power. Further, one or two lens components are enough for configuration of the focusing group, but more preferably the focusing group is composed of one lens component. The focusing group can be used for auto focus, and also can be suitably driven by a motor for auto focus, for example, an ultrasonic motor, a stepping motor, a VCM motor or the like.

Further, in the variable magnification optical system according to each of the above-mentioned examples, any lens group in the entirety thereof or a portion thereof can be shifted in a direction including a component perpendicular to the optical axis as a vibration reduction group, or rotationally moved (swayed) in an in-plane direction including the optical axis for conducting vibration reduction. Particularly, in the variable magnification optical system according to each of the above-mentioned examples, it is preferable that the B group is used as a vibration reduction group. Further, although vibration reduction group may be composed of one cemented lens as in each of the above-mentioned examples, it may be also composed of a single lens or two or more lens components without particularly limiting the number of lenses. Further, it is preferable that the vibration reduction group has negative refraction power. Further, it is preferable that the vibration reduction group is composed of a part of one lens group, and it is more preferable that one lens group is divided into three parts and the vibration reduction group is composed of a center part of the three parts. Furthermore, it is preferable that one lens group is divided into three positive-negative-positive parts or positive-negative-negative parts, and the vibration reduction group is composed of a center negative part of the three parts.

Further, in the variable magnification optical system according to each of the above-mentioned examples, a lens surface of a lens may be a spherical surface, a plane surface, or an aspherical surface. Further, each lens may be formed by a glass material, a resin material or a composite of a glass material and a resin material. When a lens surface is a spherical surface or a plane surface, lens processing and assembly adjustment become easy, so that deterioration in optical performance caused by a lens processing error and an assembly adjustment error can be prevented and thus it is preferable. Moreover, even if the image plane is shifted, deterioration in optical performance is little conveniently. When a lens surface is an aspherical surface, the aspherical surface may be fabricated by a grinding process, a glass molding process that a glass material is formed into an aspherical shape by a mold, or a compound type process that a resin material on a glass surface is formed into an aspherical shape. Further, a lens surface may be a diffractive optical surface, and a lens may be a graded-index type lens (GRIN lens) or a plastic lens.

Moreover, lens surfaces of lenses configuring the variable magnification optical system according to each example may be coated with anti-reflection coating. With this contrivance, it is feasible to reduce a flare as well as ghost and attain high contrast and high optical performance. Particularly, in the variable magnification optical system according to each of the above-mentioned examples, it is preferable to coat an object side lens surface of the second lens counted from a most object side with anti-reflection coating.

Next, a camera equipped with a variable magnification optical system according to an embodiment of the present application, will be explained with referring to FIG. 33.

Figure 33:
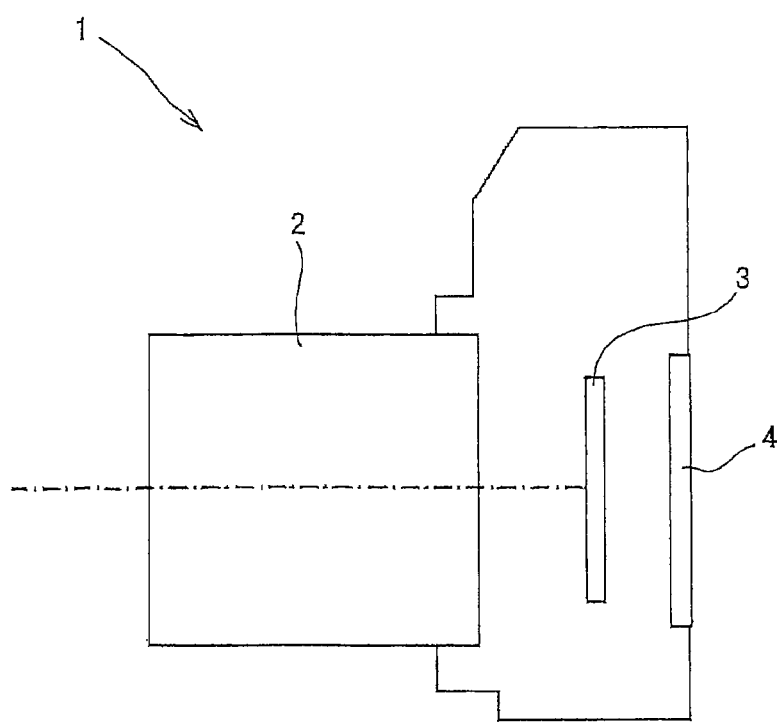
FIG. 33 shows a configuration of a camera equipped with the variable magnification optical system.

FIG. 33 is a sectional view showing a configuration of the camera equipped with the variable magnification optical system according to the embodiment of the present application.

As shown in FIG. 33, a camera 1 is a so-called mirrorless camera of lens-replaceable type equipped with the variable magnification optical system according to the above-mentioned First Example as an imaging lens 2.

In the present camera 1, light emitted from an unillustrated object is converged by the imaging lens 2, and an object image is formed on an imaging surface of an imaging unit 3 through an unillustrated OLPF (Optical low pass filter). Then, the object image is photo-electrically converted by a photoelectric conversion element in the imaging unit 3 to generate an image of the object. This image is displayed on an EVF (Electronic view finder) 4 mounted in the camera 1. Accordingly, a photographer can observe the object image through the EVF 4.

Further, when the photographer presses an unillustrated release button down, the image of the object generated in the imaging unit 3 is stored in an unillustrated memory. In this manner, the photographer can take a picture of an object by the present camera 1.

Hence, the variable magnification optical system according to the above First Example, mounted as the imaging lens 2 in the present camera 1, has excellent optical performance and a focusing lens group reduced in weight. That is, the present camera 1 can realize excellent optical performance and high speed focusing operation. Moreover, even when a camera is configured to mount thereon the variable magnification optical system according to each of the above Second to Eighth Examples, as the imaging lens 2, the camera can provide the same advantageous effects as the above camera 1 can do. Further, even when the variable magnification optical system according to each of the above examples is mounted on a camera of single-lens reflex type having a quick return mirror and observing an object by a finder optical system, the camera can provide the same advantageous effects as the above camera 1 can do.

Figure 34:
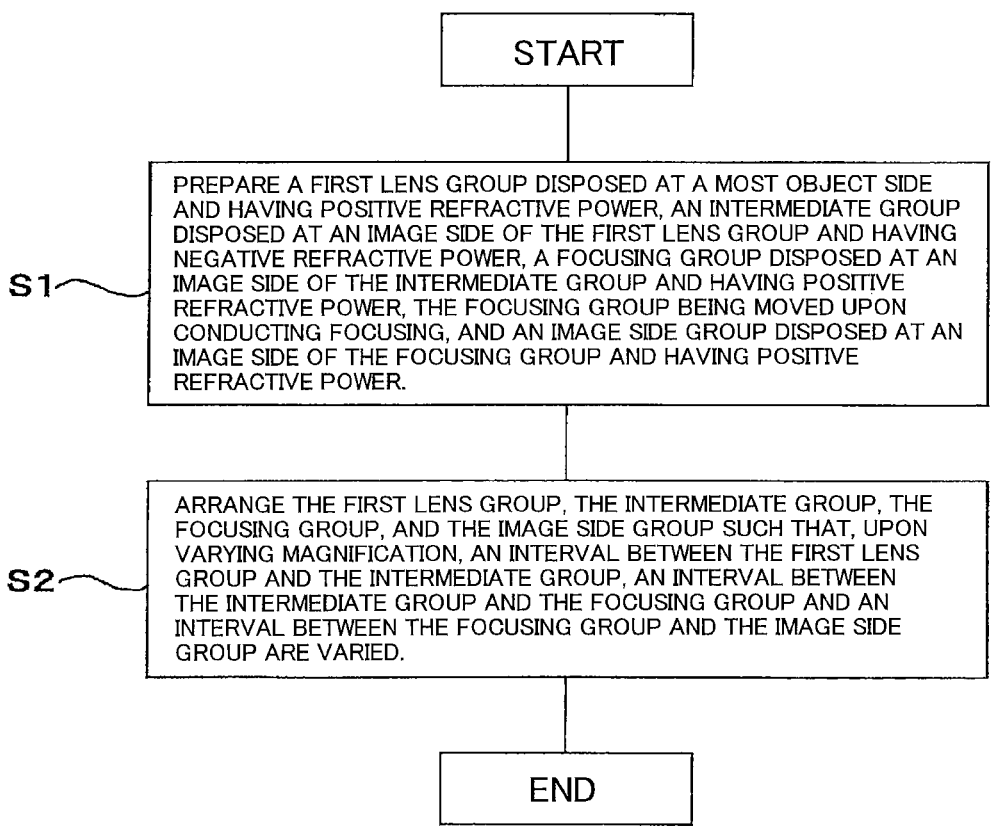
FIG. 34 is a flowchart schematically explaining a method for manufacturing the variable magnification optical system.

Finally, an outline of a method for manufacturing a variable magnification optical system according to the present embodiment, is described with referring to FIG. 34.

FIG. 34 is a flowchart showing an outline of a method for manufacturing the variable magnification optical system according to the present embodiment.

A method for manufacturing a variable magnification optical system according to the present embodiment as shown in FIG. 34 comprises a step S1 of preparing a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power, and a step S2 of arranging the first lens group, the intermediate group, the focusing group, and the image side group such that, upon varying magnification, a distance between the first lens group and the intermediate group, a distance between the intermediate group and the focusing group and a distance between the focusing group and the image side group are varied, the image side group being composed of, in order from an object side, an A group having positive refractive power, a B group satisfying the following conditional expression (1) with respect to the A group and having negative refractive power, and a C group:

$$1.67 < fA/(-fB) < 2.80 \qquad (1)$$

where fA denotes a focal length of the A group, and fB denotes a focal length of the B group.

According to the method for manufacturing a variable magnification optical system of the present embodiment, it is possible to manufacture a variable magnification optical system having excellent optical performance and a focusing lens group reduced in weight in order to attain high speed focusing operation.

What is claimed is:
1. A variable magnification optical system, comprising:
a first lens group disposed at a most object side and having positive refractive power;
an intermediate group disposed at an image side of the first lens group and having negative refractive power;

a focusing group disposed at an image side of the intermediate group and having positive refractive power, the focusing group being moved upon focusing; and an image side group disposed at an image side of the focusing group and having positive refractive power;

upon varying magnification, a distance between the first lens group and the intermediate group, a distance between the intermediate group and the focusing group and a distance between the focusing group and the image side group being varied;

the image side group comprising, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group, and fB denotes a focal length of the B group; and the following conditional expression being satisfied:

$$2.50 < f1/(-fc) \leq 4.365$$

where f1 denotes a focal length of the first lens group, and fc denotes a focal length of the intermediate group.

2. A variable magnification optical system according to claim 1, wherein the following conditional expression is satisfied:

$$0.25 < ff/fi < 1.10$$

where ff denotes a focal length of the focusing group, and fi denotes a focal length of the image side group.

3. A variable magnification optical system according to claim 1, wherein the following conditional expression is satisfied:

$$1.80 < fi/(-fB) < 5.20$$

where fi denotes a focal length of the image side group.

4. A variable magnification optical system according to claim 1, wherein the focusing group comprises at least one positive lens and the following conditional expression is satisfied:

$$58.00 < vFP$$

where vFP denotes an Abbe number for d-line (wavelength 587.6 nm) of the positive lens.

5. A variable magnification optical system, comprising:

a first lens group disposed at a most object side and having positive refractive power;

an intermediate group disposed at an image side of the first lens group and having negative refractive power;

a focusing group disposed at an image side of the intermediate group and having positive refractive power, the focusing group being moved upon focusing; and an image side group disposed at an image side of the focusing group and having positive refractive power;

upon varying magnification, a distance between the first lens group and the intermediate group, a distance between the intermediate group and the focusing group and a distance between the focusing group and the image side group being varied;

the image side group comprising, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group, and fB denotes a focal length of the B group; and the following conditional expression being satisfied:

$$0.492 \leq ff/fi < 1.10$$

where ff denotes a focal length of the focusing group, and fi denotes a focal length of the image side group.

6. A variable magnification optical system according to claim 5, wherein the following conditional expression is satisfied:

$$2.50 < f1/(-fc) < 6.20$$

where f1 denotes a focal length of the first lens group, and fc denotes a focal length of the intermediate group.

7. A variable magnification optical system according to claim 5, wherein the following conditional expression is satisfied:

$$1.80 < fi/(-fB) < 5.20.$$

8. A variable magnification optical system according to claim 5, wherein the focusing group comprises at least one positive lens and the following conditional expression is satisfied:

$$58.00 < vFP$$

where vFP denotes an Abbe number for d-line (wavelength 587.6 nm) of the positive lens.

9. A variable magnification optical system, comprising:

a first lens group disposed at a most object side and having positive refractive power;

an intermediate group disposed at an image side of the first lens group and having negative refractive power;

a focusing group disposed at an image side of the intermediate group and having positive refractive power, the focusing group being moved upon focusing; and an image side group disposed at an image side of the focusing group and having positive refractive power;

upon varying magnification, a distance between the first lens group and the intermediate group, a distance between the intermediate group and the focusing group and a distance between the focusing group and the image side group being varied; and the image side group comprising, in order from an object side, an A group having positive refractive power, a B group satisfying the following conditional expression with respect to the A group and having negative refractive power, and a C group:

$$1.67 < fA/(-fB) \leq 1.836$$

where fA denotes a focal length of the A group, and fB denotes a focal length of the B group.

10. A variable magnification optical system according to claim 9, wherein the following conditional expression is satisfied:

$$2.50 < f1/(-fc) < 6.20$$

where f1 denotes a focal length of the first lens group, and fc denotes a focal length of the intermediate group.

11. A variable magnification optical system according to claim 9, wherein the following conditional expression is satisfied:

$$0.25 < ff/fi < 1.10$$

where ff denotes a focal length of the focusing group, and fi denotes a focal length of the image side group.

12. A variable magnification optical system according to claim 9, wherein the following conditional expression is satisfied:

$$1.80 < fi/(-fB) < 5.20$$

where fi denotes a focal length of the image side group.

13. A variable magnification optical system according to claim 9, wherein the focusing group comprises at least one positive lens and the following conditional expression is satisfied:

$$58.00 < vFP$$

where vFP denotes an Abbe number for d-line (wavelength 587.6 nm) of the positive lens.

14. A method for manufacturing a variable magnification optical system, comprising steps of:
arranging a first lens group disposed at a most object side and having positive refractive power, an intermediate group disposed at an image side of the first lens group and having negative refractive power, a focusing group disposed at an image side of the intermediate group and having positive refractive power, the focusing group being moved upon focusing, and an image side group disposed at an image side of the focusing group and having positive refractive power;
the arrangement being such that, upon varying magnification, a distance between the first lens group and the intermediate group, a distance between the intermediate group and the focusing group and a distance between the focusing group and the image side group are varied; and
the method further comprising at least one or more of the following features (A), (B) and (C):
(A) configuring the image side group to comprise, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group, and fB denotes a focal length of the B group, and
satisfying the following conditional expression:

$$2.50 < f1/(-fc) \leq 4.365$$

where f1 denotes a focal length of the first lens group, and fc denotes a focal length of the intermediate group;
(B) configuring the image side group to comprise, in order from an object side, an A group having positive refractive power, a B group satisfying the following conditional expression with respect to the A group and having negative refractive power, and a C group:

$$1.67 < fA/(-fB) < 2.80$$

where fA denotes a focal length of the A group, and fB denotes a focal length of the B group, and satisfying the following conditional expression:

$$0.492 \leq ff/fi < 1.10$$

where ff denotes a focal length of the focusing group, and fi denotes a focal length of the image side group;
(C) configuring the image side group to comprise, in order from an object side, an A group having positive refractive power, a B group satisfying the following conditional expression with respect to the A group and having negative refractive power, and a C group:

$$1.67 < fA/(-fB) \leq 1.836$$

where fA denotes a focal length of the A group, and fB denotes a focal length of the B group.

* * * * *